United States Patent
Farina et al.

(10) Patent No.: US 9,843,173 B2
(45) Date of Patent: Dec. 12, 2017

(54) SWITCHGEAR APPARATUS OF THE WITHDRAWABLE TYPE

(71) Applicant: ABB Technology AG, Zurich (CH)

(72) Inventors: Andrea Farina, Monza (IT); Stefano Magoni, Osio Sotto (IT)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 15/116,928

(22) PCT Filed: Jan. 27, 2015

(86) PCT No.: PCT/EP2015/051540
§ 371 (c)(1),
(2) Date: Aug. 5, 2016

(87) PCT Pub. No.: WO2015/117858
PCT Pub. Date: Aug. 13, 2015

(65) Prior Publication Data
US 2017/0179692 A1    Jun. 22, 2017

(30) Foreign Application Priority Data
Feb. 6, 2014   (EP) .................................. 14154093

(51) Int. Cl.
*H01H 33/666*   (2006.01)
*H02B 11/10*    (2006.01)
(Continued)

(52) U.S. Cl.
CPC ............. *H02B 11/10* (2013.01); *H01H 3/161* (2013.01); *H01H 9/0066* (2013.01); *H02B 11/127* (2013.01); *H02B 11/167* (2013.01)

(58) Field of Classification Search
CPC .................................................... H01H 33/666
(Continued)

(56) References Cited

U.S. PATENT DOCUMENTS 3,772,489 A * 11/1973 Wilson ................. H01H 33/666
200/400
3,778,568 A * 12/1973 Wilson ................... H01H 33/46
200/50.22

(Continued)

FOREIGN PATENT DOCUMENTS

DE    19619452 A1   11/1997

*Primary Examiner* — Alexander Talpalatski
(74) *Attorney, Agent, or Firm* — Polsinelli PC

(57) ABSTRACT

A switchgear apparatus (1) comprising a switching unit (2) comprising one or more electric poles (21), a truck assembly (4), on which said switching unit is mounted, said truck assembly being movable with respect to a supporting frame (3), actuation means (5) for moving said truck assembly, said switching unit being reversibly movable between an insertion position (A), at which said switching unit is electrically connected to an electric line, and a withdrawal position (B), at which said switching unit is electrically disconnected from said electric line and an electro-mechanical signalling arrangement (6) that is mounted on said truck assembly, said electromechanical signalling arrangement interacting with said actuation means to provide electric signals indicative of the position of the switching unit at said insertion position (A), at said withdrawal position (B) or at an intermediate position (C) that is different from said insertion position and said withdrawal position.

The electro-mechanical signalling arrangement comprises an auxiliary contact device (7) of the rotational type and a first and second signalling mechanism (8, 9) to actuate said auxiliary contact device.

20 Claims, 20 Drawing Sheets

(51) Int. Cl.
  *H02B 11/167* (2006.01)
  *H02B 11/127* (2006.01)
  *H01H 9/00* (2006.01)
  *H01H 3/16* (2006.01)

(58) Field of Classification Search
  USPC .......................................................... 218/154
  See application file for complete search history.

(56) References Cited

U.S. PATENT DOCUMENTS

| | | | | |
|---|---|---|---|---|
| 4,973,803 | A * | 11/1990 | Fujiwara | H01H 33/666 |
| | | | | 218/120 |
| 6,884,949 | B2 * | 4/2005 | Yoon | H02B 11/133 |
| | | | | 200/50.26 |
| 7,053,327 | B2 * | 5/2006 | Benke | H01H 33/666 |
| | | | | 218/120 |
| 7,696,447 | B2 * | 4/2010 | Chen | H01H 3/3005 |
| | | | | 200/400 |
| 8,183,480 | B2 * | 5/2012 | Kim | H01H 33/666 |
| | | | | 200/50.21 |
| 8,395,064 | B2 * | 3/2013 | Kim | H02B 11/133 |
| | | | | 200/50.21 |
| 8,440,930 | B2 * | 5/2013 | Lee | H01H 3/46 |
| | | | | 218/140 |
| 2015/0179374 | A1 * | 6/2015 | Seo | H01H 33/48 |
| | | | | 218/140 |

* cited by examiner

SWITCHGEAR APPARATUS OF THE WITHDRAWABLE TYPE

CROSS REFERENCE TO RELATED APPLICATIONS

This application is a National Phase filing under 35 U.S.C. §371 of PCT/EP2015/051540 filed on Jan. 27, 2015; and this application claims priority to Application No. 14154093.0 filed in Europe on Feb. 6, 2014 under 35 U.S.C. §119. The entire contents of each application are hereby incorporated by reference.

The present invention relates to an auxiliary contact device for low voltage (LV) or medium voltage (MV) switchgears, such as circuit breakers, contactors, disconnectors and the like.

For the purposes of the present application, the term "low voltage" is referred to apparatuses operating at voltages lower than 1 kV AC whereas the term "medium voltage" is referred to apparatuses operating at voltages in the range of 1-50 kV AC.

The use of switchgears of the withdrawable type in LV or MV switchboard is well known. Generally, a withdrawable switchgear comprises a switching unit mounted on a track that is movable with respect to a fixed supporting frame.

The switchgear comprises a motor to move said track, which is coupled to an endless screw that is operatively connected to said fixed frame and said truck.

The track can be reversibly moved between an insertion position, at which the switching unit is electrically connected to an electric line, and a withdrawal position, at which the switching unit is electrically disconnected from said electric line.

Typically, a withdrawable switchgear comprises signalling means of the position of the switching unit, which are arranged on the truck and provide electric signals that are indicative of the actual position of the switching unit.

Traditionally, said signalling means comprise two auxiliary contact devices, each of which is actuated by a corresponding kinematic chain that is operatively connected to the endless screw that transmits motion to the track assembly.

Normally, auxiliary contact devices of the linear type are adopted, in which one or more movable contacts move with a linear motion with respect to a plurality of fixed contacts to electrically couple/decouple with/from these latter.

Since they include two distinct and separated signalling chains of the position of the switching unit, signalling means of the traditional type have a relatively huge size.

Further, they are relatively complex, time-consuming and expensive to assembly at industrial level.

It is an object of the present invention to provide a LV or MV switchgear apparatus that allows overcoming the above-mentioned problems.

More in particular, it is an object of the present invention to provide a switchgear apparatus, in which the signalling means of the position of the switching unit have a relatively small size and are relatively easy to assembly.

Another object of the present invention is to provide a switchgear apparatus, which can be easily manufactured at industrial level and at competitive costs.

The present invention thus provides a LV or MV switchgear apparatus, according to the following claim 1 and related dependent claims.

In a further aspect, the present invention relates to an electro-mechanical signalling arrangement for a LV or MV switchgear apparatus, according to the following claim 14.

Further characteristics and advantages of the invention will emerge from the description of preferred, but not exclusive, embodiments of the switchgear apparatus, according to the invention, non-limiting examples of which are provided in the attached drawings, wherein.

Figure 1:
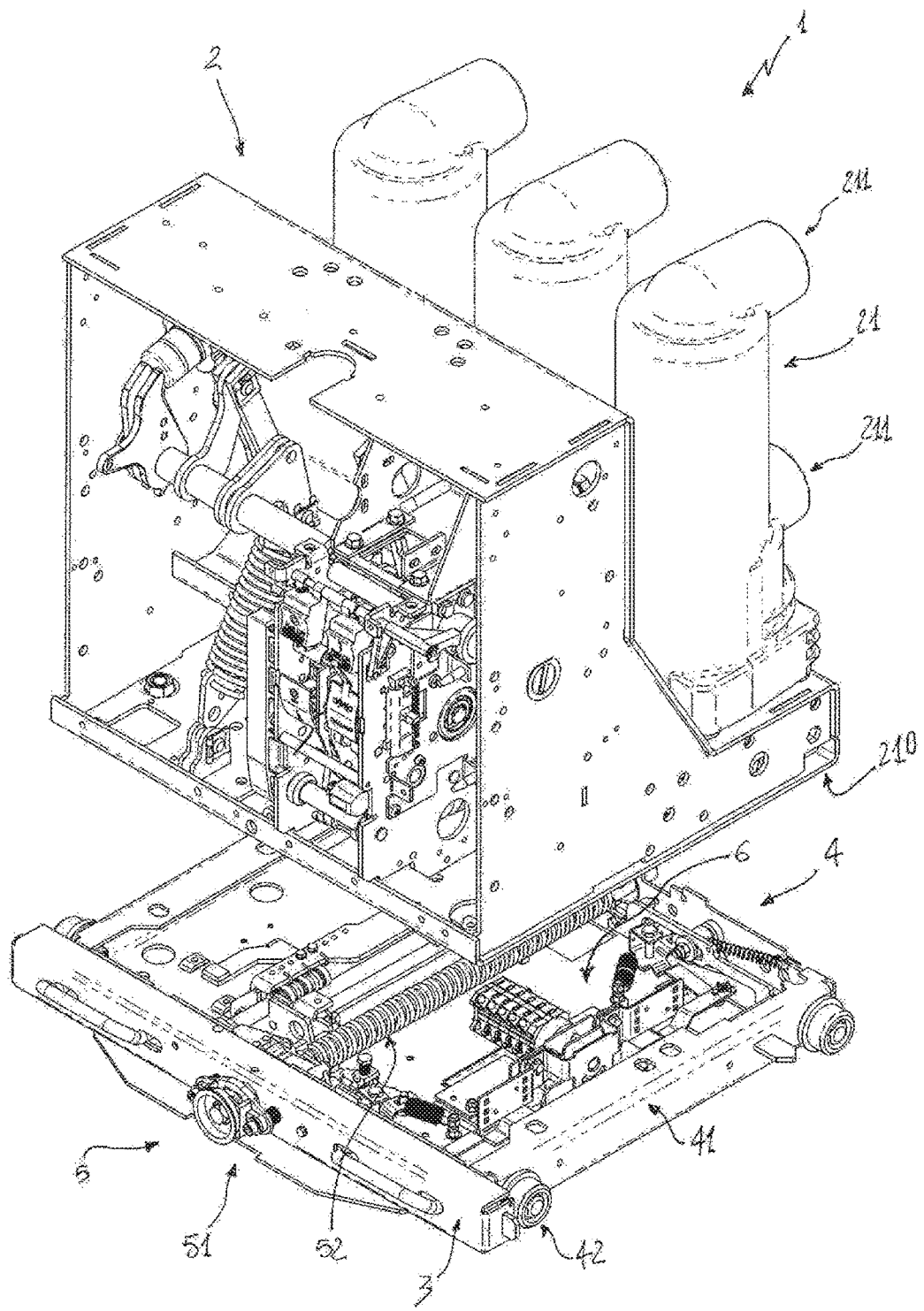
FIG. 1 shows a schematic exploded view of the switchgear apparatus, according to the invention, in a preferred embodiment.
Figure 2:
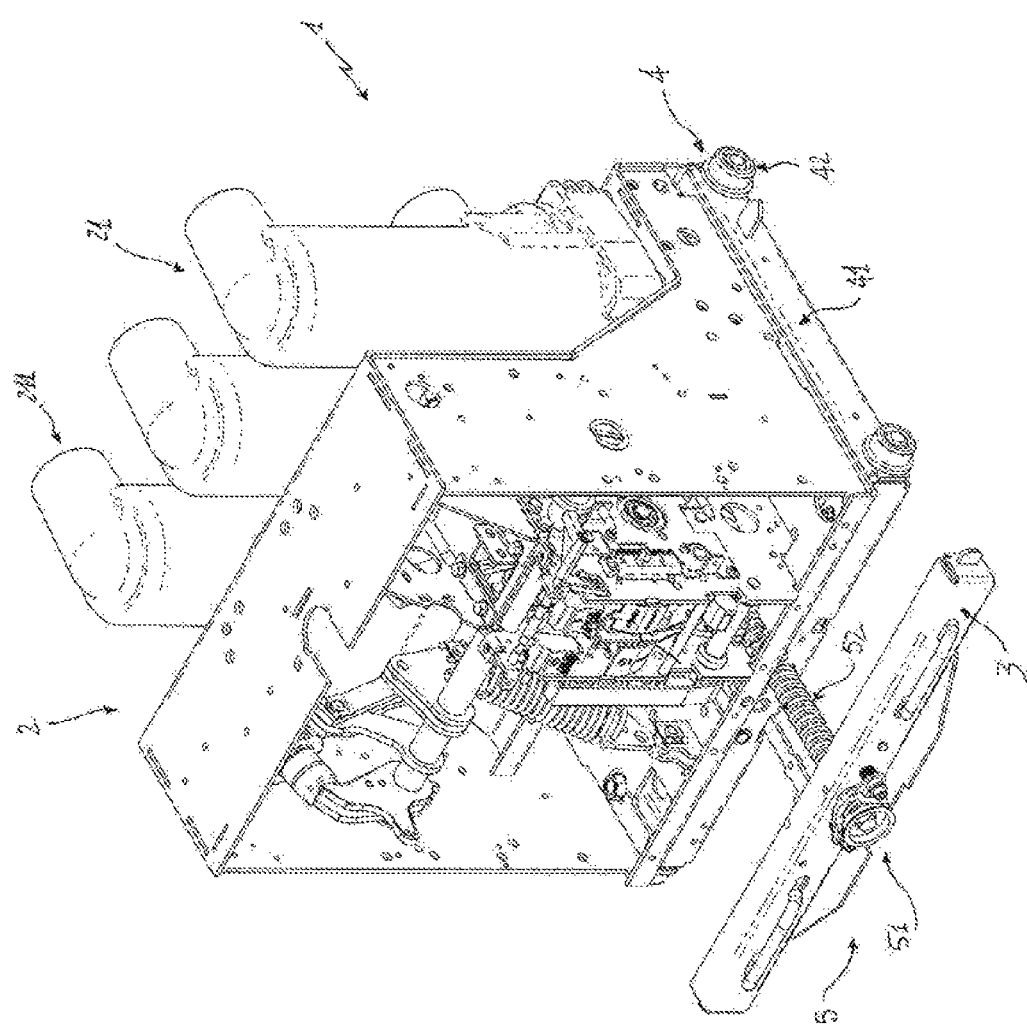
FIG. 2 shows a schematic view of the switchgear apparatus of FIG. 1 with the switching unit in an insertion position.
Figure 3:
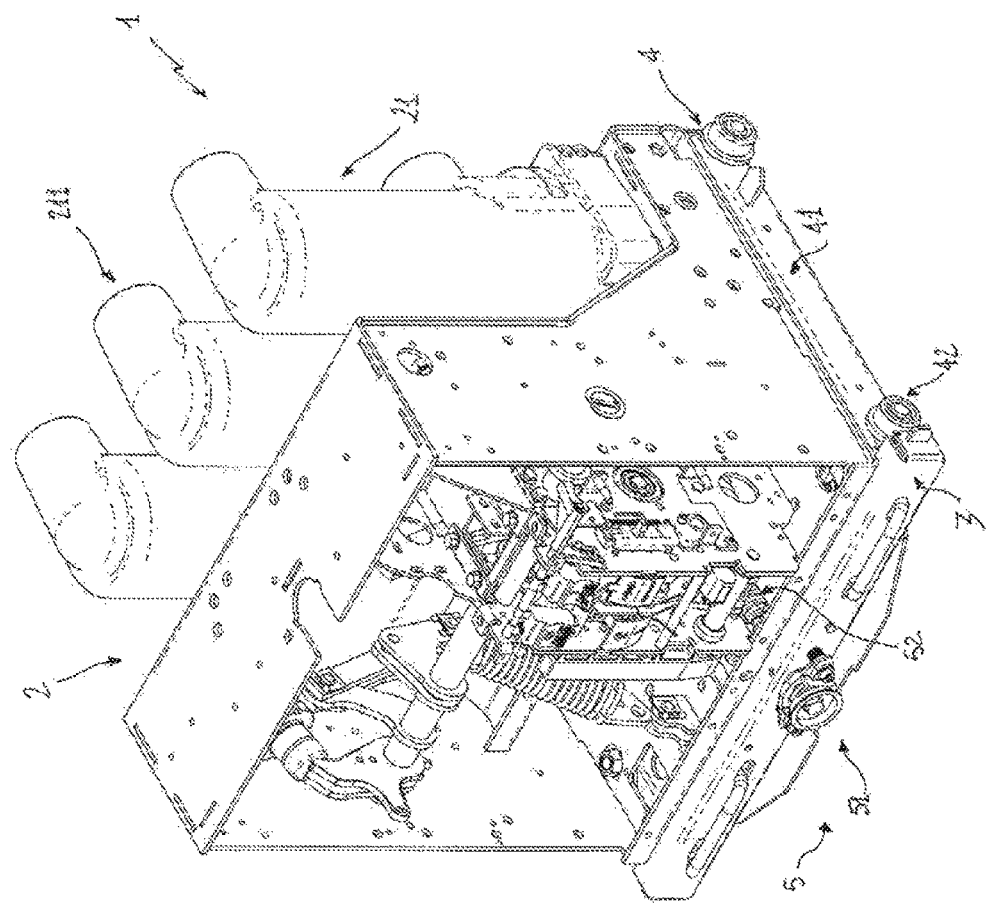
FIG. 3 shows a schematic view of the switchgear apparatus of FIG. 1 with the switching unit in a withdrawal position.
Figure 4:
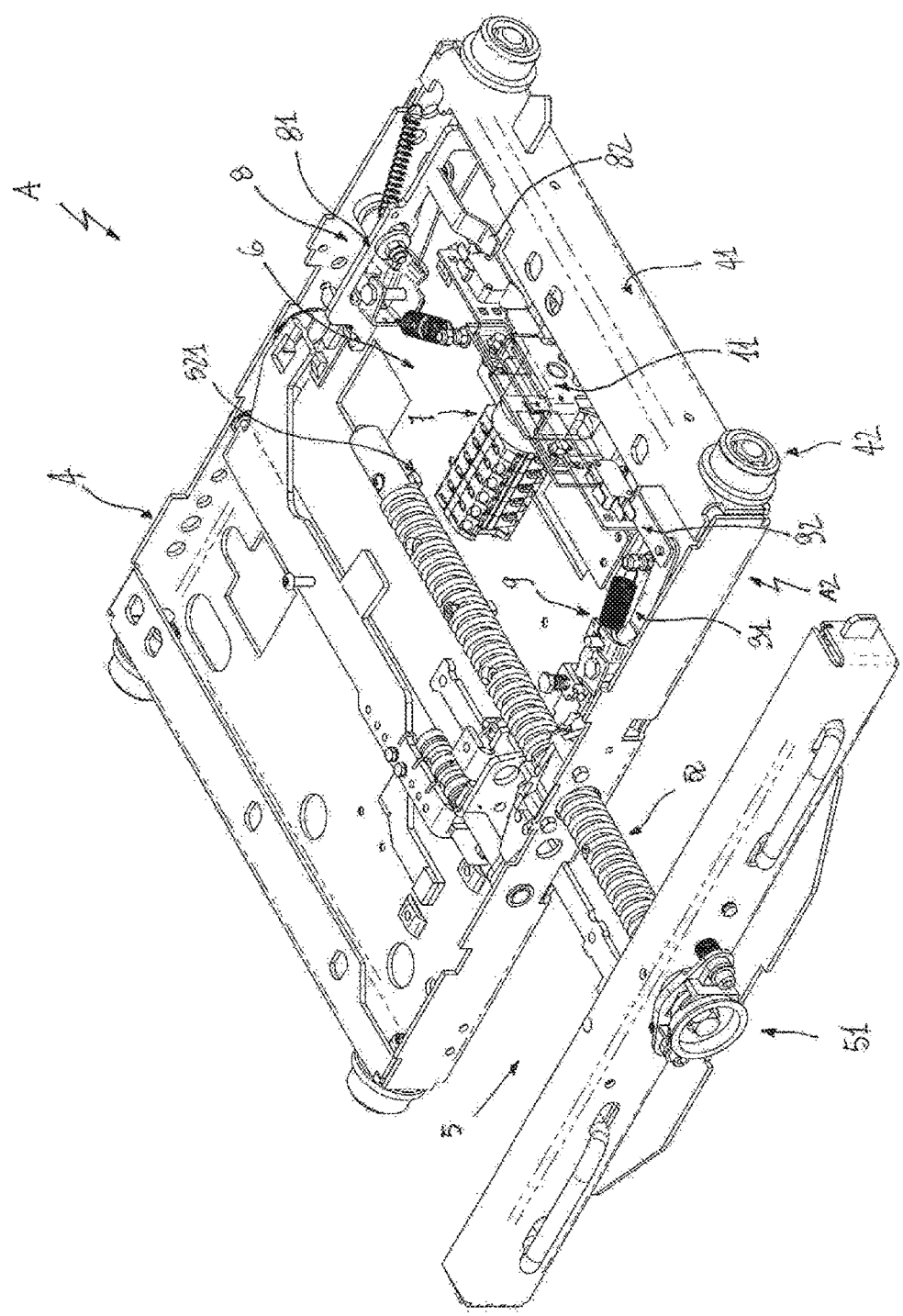
FIGS. 4-8 show schematic views of different portions of an electro-mechanical signalling arrangement included in the switchgear apparatus of FIG. 1, with the switching unit in an insertion position.
Figure 5:
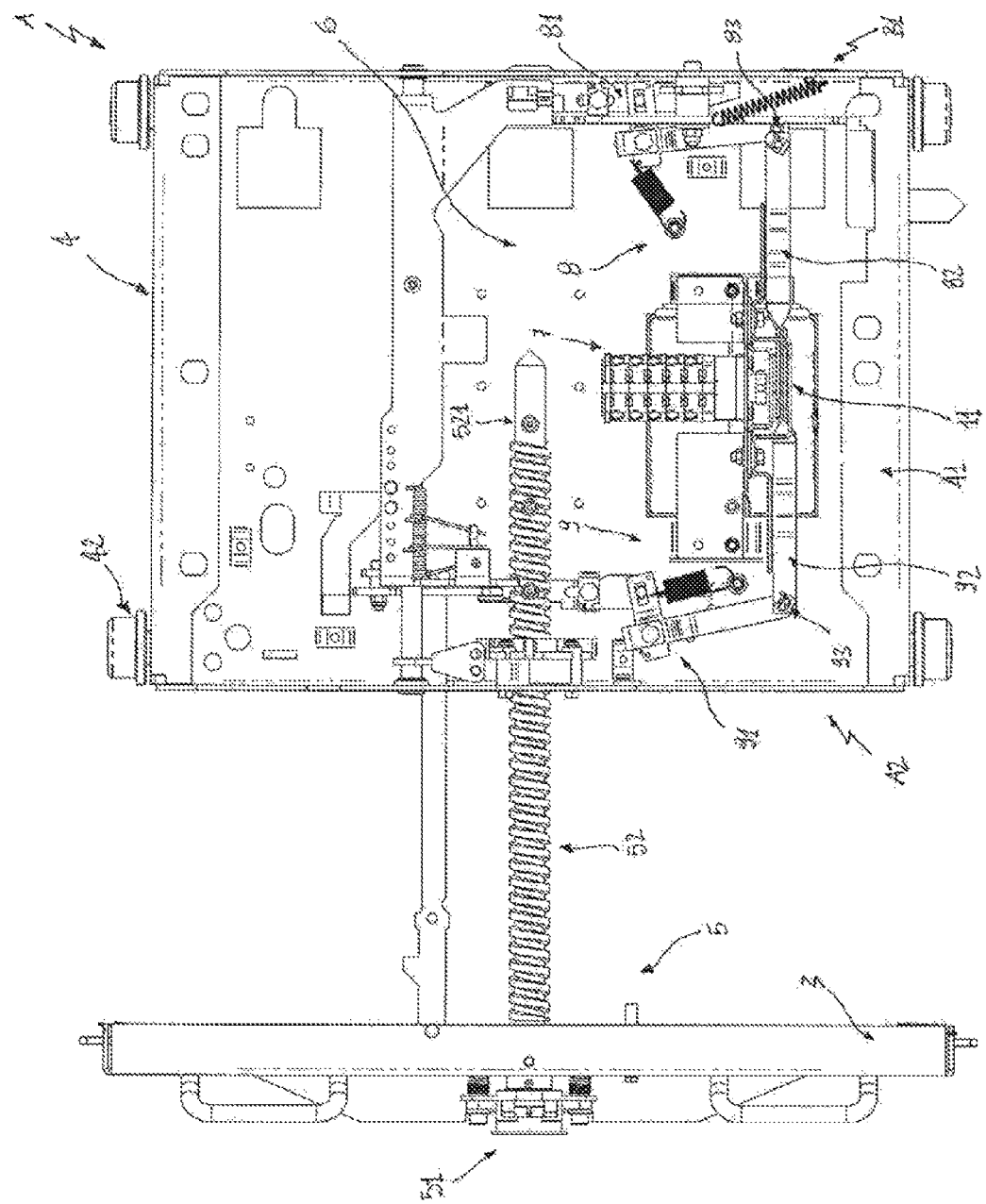

Referring to the cited figures, the present invention relates to a LV or MV switchgear apparatus 1 of the withdrawable type.

The switchgear apparatus 1 comprises a switching unit 2 that includes one or more electric poles 21.

Each electric pole 21 has at least a fixed switch contact and a movable switch contact (not shown) that can be mutually coupled/separated.

Further, each electric pole 21 comprises disconnection contacts 211 that connect it with corresponding phase contacts of an electric line.

The switchgear apparatus 1 comprises a truck assembly 4, on which the switching unit 2 is mounted.

The truck assembly 4 is movable with respect to a fixed supporting frame 3 that may be, for example, a supporting casing of the switchgear apparatus 1 or a panel of the switchboard, in which the switchgear apparatus 1 is installed.

Advantageously, the truck assembly 4 comprises a shaped casing 41 that defines an internal volume and is advantageously provided with external wheels or rollers 42 that are adapted to slide along supporting guides (not shown) of the supporting frame 3.

Referring to a normal installation configuration of the switchgear apparatus 1, the switching unit 2 is mounted on the truck assembly 4 at its lower wall 210 (FIG. 1).

In practice, the truck assembly 4 forms a movable base for the switching unit 2 that can move with respect to the supporting frame 3.

The switchgear apparatus 1 comprises actuation means 5 for moving the truck assembly 4. Preferably, said actuation means comprises an electric motor 51 and an endless screw 52, which is operatively coupled (at one of its ends) to the shaft of the electric motor, so as to be rotated by this latter.

The electric motor 51 is commanded by a control device, which may be the control unit of the switchgear apparatus 1, a relay or another control device.

Preferably, the electric motor 51 is solidly connected to the supporting frame 3 whereas the endless screw 52 is operatively coupled with threaded holes or bushes at the walls of the shaped casing 41 of the truck assembly 4.

In this way, a rotation motion of the endless screw 52, when it is actuated by the electric motor 51, causes a linear motion of the truck assembly 4 that moves on the supporting guides of the supporting frame 3, along the longitudinal axis of the endless screw.

Preferably, the endless screw 52 can also be operated by a manual tool, e.g. a crank, to be inserted in a suitable maneuvering seat (not shown) that can be accessed by a user.

As mentioned above, the switching unit 2 is mounted on the truck assembly 4 and is solidly fixed with this latter. In this way, when the truck assembly 4 moves, the switching unit 2 solidly moves with it, according to a translatory movement.

The switching unit 2 is thus reversibly movable (together with the truck assembly 4) with respect to the supporting frame 3.

In particular, the switching unit 2 is movable between an insertion position A, at which it is electrically connected to the electric line (not shown), and a withdrawal position B, at which it is electrically disconnected from the electric line.

When the switching unit 2 is in the insertion position A, the disconnection contacts 211 of the switching unit are electrically coupled to the corresponding phase contacts of the electric line.

When the switching unit 2 is in the withdrawal position B, the disconnection contacts 211 are electrically disconnected from the phase contacts of the electric line and are positioned at a safety distance from these latter.

While moving between the insertion position A and the withdrawal position B, and vice-versa, the switching unit 2 passes through intermediate positions C.

In the context of the present invention, the intermediate positions C are any positions of the switching unit 2 different from the insertion position A and the withdrawal position B and located between said positions A, B.

When the switching unit 2 is in an intermediate position C, the disconnection contacts 211 are electrically disconnected the phase contacts of the electric line but are not positioned at a safety distance from these latter.

The switchgear apparatus 1 comprises an electro-mechanical signalling arrangement 6 that is mounted on the truck assembly 4.

The signalling arrangement 6 is accommodated on board the truck assembly 4, in the internal volume of the casing 41.

The signalling arrangement 6 is adapted to interact with the actuation means 5 (in particular with the endless screw 52) to provide electric signals I1, I2 indicative of the position of the switching unit 2 at the insertion position A, at the withdrawal position B or at an intermediate position C.

The signalling arrangement 6 comprises an auxiliary contact device 7.

The auxiliary contact device 7 comprises a fixed contact sub-assembly 71 that is provided with a plurality of fixed contacts, preferably with a pair of first fixed contacts 711 and a pair of second fixed contacts 712.

The auxiliary contact device 7 comprises a movable contact sub-assembly 72 that is provided with one or more movable contacts 721 that are rotationally couplable with the fixed contacts 711, 712 of the fixed contact sub-assembly 71.

Preferably, the movable contact sub-assembly 72 comprises a pair of movable contacts 721 that are rotationally couplable with the first and second fixed contacts 711, 712.

The auxiliary contact device 7 further comprises a rotating shaft 73 that is solidly coupled with the movable contact sub-assembly 72.

The rotating shaft 73 is free to rotate around a first axis 100.

In particular, the rotating shaft 73 can reversibly rotate among a first rotation position R1, at which the movable contacts 721 are not coupled with the first and second fixed contacts 711, 712, a second rotation position R2, at which the movable contacts 721 are coupled with the first fixed contacts 711 and a third rotation position R3, at which the movable contacts 721 are coupled with the second fixed contacts 712.

As it will be better described in the following, the electro-mechanical signalling arrangement 6 is configured so that:

the rotating shaft 73 is in the first rotation position R1, when the switching unit 2 is in an intermediate position C;

the rotating shaft 73 is in the second rotation position R2, when the switching unit 2 is in the withdrawal position B;

the rotating shaft 73 is in the third rotation position R3, when the switching unit 2 is in the insertion position A.

Preferably, the electro-mechanical signalling arrangement 6 comprises a first signalling circuit 751 and a second signalling circuit 752, which electrically connect the auxiliary contact device 7 with a control unit 200, which may be the control unit of the switchgear apparatus 1, a relay or another control device.

The first and second signalling circuits 751, 752 provide electrical signals I1, I2 (preferably in the form of signalling currents) to the control unit 200, which are indicative of the position of the switching unit 2.

The first and second fixed contacts 711, 712 are connected with the first and second signalling circuits 751, 752, respectively.

When the rotating shaft 73 is in the first rotation position R1, which corresponds to an intermediate position C of the switching unit 2, no signalling currents I1, I2 are provided by the first and second signalling circuits, since the movable contacts 721 are not coupled with the fixed contacts 711-712.

Advantageously, the control unit 200 is arranged to read the absence of signalling currents I1, I2 as informative of the positioning of the switching unit 2 at an intermediate position C. In this way, there is no need of arranging dedicated third fixed contacts and a corresponding third signalling circuit for signalling that the switching unit 2 is at an intermediate position C. When the rotating shaft 73 is in the second rotation position R2, which corresponds to the withdrawal position B of the switching unit 2, a first signalling current I1 flows through the first signalling circuit 751, since the movable contacts 721 are coupled with the first fixed contacts 711. No signalling current I2 is instead provided by the second signalling circuit 752. When the rotating shaft 73 is in the third rotation position R3, which corresponds to the insertion position A of the switching unit 2, a second signalling current I2 flows through the second signalling circuit 752, since the movable contacts 721 are coupled with the second fixed contacts 712. No signalling current I1 is instead provided by the first signalling circuit 751.

The electro-mechanical signalling arrangement 6 comprises a first signalling mechanism 8, a second signalling mechanism 9 and motion transmission means 11, which couple said first and second mechanisms with the rotating shaft 73 of the auxiliary contact device 7.

The first signalling mechanism 8 comprises a first actuation mechanism 81 that interacts with the actuation means 5, in particular with the endless screw 52.

The first signalling mechanism 8 further comprises a first actuation rod 82 that is operatively connected to the first actuation mechanism 81.

The first actuation mechanism 81 is configured to move the first actuation rod 82 with a linear motion between a first position B1, which corresponds to a position A or C of the switching unit 2, which is different from the withdrawal position B, and a second position B2, which corresponds to the withdrawal position B.

The first actuation mechanism 81 comprises a first connection point 83, at which it is operatively connected with the first actuation rod 82.

Preferably, the first actuation mechanism 81 is activated by the endless screw 82, when the switching unit 2 reaches or leaves the withdrawal position B, and it remains in a rest condition otherwise.

Advantageously, the second actuation mechanism 91 comprises a first system of levers and springs that are suitably arranged (even according to solutions of known type) to mutually cooperate and linearly move the first connection point 83.

The second signalling mechanism 9 comprises a second actuation mechanism 91 that interacts with the actuation means 5, in particular with the endless screw 52.

The second signalling mechanism 9 further comprises a second actuation rod 92 that is operatively connected to the second actuation mechanism 91.

The second actuation mechanism 91 is configured to move the second actuation rod 92 with a linear motion between a third position A1, which corresponds to a position B or C of the switching unit 2, which is different from the insertion position A, and a fourth position A2, which corresponds to the insertion position A.

The second actuation mechanism 91 comprises a second connection point 93, at which it is operatively connected with the second actuation rod 92.

Preferably, the actuation mechanism 91 is activated by the endless screw 52, when the switching unit 2 reaches or leaves the insertion position A, and it remains in a rest condition otherwise.

Advantageously, the second actuation mechanism 91 comprises a second system of levers and springs that are suitably arranged (even according to solutions of known type) to mutually cooperate and linearly move the second connection point 93.

Preferably, the endless screw 52 comprises a plurality of transversal activation pins 521 that protrude to activate the first and second actuation mechanism 81, 91.

The motion transmission means 11 mechanically couple the first actuation rod 82 and the second actuation rod 92 with the rotating shaft 73 of the auxiliary contact device 7.

The motion transmission means 11 are configured so that the first actuation rod 82 can reversibly move the rotating shaft 73 between the first rotation position R1 and the second rotation position R2 and the second actuation rod 92 can reversibly move the rotating shaft 73 between the first rotation position R1 and the third rotation position R3.

Preferably, the motion transmission means 11 comprise a crank member 12 that is solidly coupled to the rotating shaft 73 of the auxiliary contact device 7, so that it rotates about the same rotation axis 100 of the rotating shaft 73.

Preferably, the motion transmission means 11 comprise a motion transmission pin 13, which protrudes from the crank member 12 along a second axis 12 that is parallel and spaced with respect to the first axis 100.

During the rotation of the rotating shaft 72 and the crank member 11, the motion transmission pin 13 moves along a circumference portion that is centred on the first axis 100.

The motion transmission pin 13 is operatively coupled with the first and second actuation rods 82, 92 and is actuated by suitable coupling surfaces of such rods 82, 92.

Preferably, the first actuation rod 82 comprises a first plate portion 821, which is oriented perpendicularly with respect to the first axis 100, and a second plate portion 822, which is oriented perpendicularly with respect to the first plate portion 821.

Preferably, the first plate portion 821 comprises a first slot 823 provided with one or more first coupling surfaces 824 with the motion transmission pin 13.

Preferably, the motion transmission pin 13 passes through the first slot 823 and the first coupling surfaces 824 are formed by internal edges of the first slot 823, with which the motion transmission pin 13 is slidingly coupled.

Preferably, the first coupling surfaces 824 of the first rod 82 have curved profiles. In this way, the translatory motion of the first actuation rod 82 causes a rotational movement of the motion transmission pin 13.

Preferably, the first slot 823 is positioned at the end 821A of the first plate portion 821 that is in a distal position with respect to second plate portion 822.

Preferably, the second plate portion 822 comprises a first flat end 822A and a second flat end 822B that are in a proximal and distal position with respect to the first plate portion 821, respectively.

Preferably, at the second flat end 822B, the second plate portion 822 comprises a first connection hole 825 where the first actuation rod 82 is operatively connected with the first actuation mechanism 81, at the first connection point 83 of this latter.

Preferably, between the first flat end 822A and the second flat end 822B, the second plate portion 822 comprises a first central sub-portion 822C, which is shaped to form a groove with respect to the sliding plane of the second flat portion 822.

Preferably, the second actuation rod 92 comprises a third plate portion 921, which is oriented perpendicularly with respect to the first axis 100, and a fourth plate portion 922, which is oriented perpendicularly with respect to the third plate portion 921.

Preferably, the third plate portion 921 comprises a second slot 923 provided with one or more second coupling surfaces 924 with the motion transmission pin 13.

Preferably, the motion transmission pin 13 passes through the second slot 923 and the second coupling surfaces 924 are formed by internal edges of the second slot 923, with which the motion transmission pin 13 is slidingly coupled.

Preferably, the second coupling surfaces 924 of the second rod 92 have curved profiles. In this way, the translatory motion of the second actuation rod 92 causes a rotational movement of the motion transmission pin 13.

Preferably, the second slot 923 is positioned at the end 921A of the third plate portion 921, which is in a distal position with respect to the fourth plate portion 922.

Preferably, the fourth plate portion 922 comprises a third flat end 922A and a fourth flat end 922B that are in a proximal and distal position with respect to the third plate portion 921, respectively.

Preferably, at the fourth flat end 922B, the fourth plate portion 922 comprises a second connection hole 925 where the second actuation rod 92 is operatively connected with the second actuation mechanism 91, at the second connection point 93 of this latter.

Preferably, between the third flat end 922A and the fourth flat end 922B, the fourth plate portion 922 comprises a second central sub-portion 922C, which is shaped to form a groove with respect to the sliding plane of the fourth flat portion 922.

Preferably, the first plate portion 821 of the first actuation rod 82 and the third plate portion 921 of the second actuation rod 92 overlap one to another, at least partially.

In particular, the first plate portion 821 and the third plate portion 921 overlap at their ends comprising respectively the first slot 823 and the second slot 923, at which they are operatively coupled with the motion transmission pin 13.

In practice, the first plate portion 821 and the third plate portion 921 slide one respect to the other along parallel planes perpendicular to the first axis 100, when the first actuation rod 82 and the second actuation rod 92 are moved. In this way, they can maintain their operative coupling with the motion transmission pin 13.

Preferably, the first coupling surfaces 824 of the first actuation rod 82 and the second coupling surfaces 924 of the second actuation rod 92 have complementary curved profiles, so that the motion transmission pin 13 with coupled with one or more overall coupling surfaces having a crescent shape.

In this way, the translatory motion of the first actuation rod 82 and the second actuation rod 92 cause a rotational movement of the motion transmission pin 13 along a same circumference centred on the first axis 100.

Preferably, the electro-mechanical signalling arrangement 6 comprises a first limit switch 15 that is electrically connected to the electric motor 51 to provide first control signals C1 to enable the electric motor 52 to perform a withdrawal operation of the switching unit 2. Preferably, the first limit switch 15 is operatively coupled with the second plate portion 822 of the first actuation rod 82 and is in a fixed position with respect to this latter. In this way, it is activated/deactivated depending on the operative position the first actuation rod 82.

When the first actuation rod 82 is in the first position B1, the first limit switch 15 is activated, since it is in contact with the first flat end 822A of the second plate portion 822.

In this case, the first limit switch 15 generates the control signals C1 that enable the electric motor 51 to perform a withdrawal operation of the switching unit 2.

When the first actuation rod 82 is in the second position B2, the first limit switch 15 is deactivated. In fact, it is no more in contact with first actuation rod 82, since it is positioned at the first central groove-shaped sub-portion 822C of the second plate portion 822.

In this case, the first limit switch 15 does not generate the control signals C1 anymore and the electric motor 51 is prevented from performing a withdrawal operation of the switching unit 2.

Preferably, the electro-mechanical signalling arrangement 6 comprise a second limit switch 16 that is electrically connected to the electric motor 51 to provide second control signals C2 that enable the electric motor 51 to perform an insertion operation of the switching unit 2. Preferably, the second limit switch 16 is operatively coupled with the fourth plate portion 922 of the second actuation rod 92 and it is in a fixed position with respect to this latter. In this way, it is activated/deactivated depending on the operative position the second actuation rod 92.

When the second actuation rod 92 is in the third position A1, the second limit switch 16 is activated, since it is in contact with the third flat end 922A of the fourth plate portion 922.

In this case, the second limit switch 16 generates the second control signals C2 that enable the electric motor 51 to perform an insertion operation of the switching unit 2.

When the second actuation rod 92 is in the fourth position A2, the second limit switch 16 is deactivated. In fact, it is no more in contact with second actuation rod 92, since it is positioned at the second central groove-shaped sub-portion 922C of the fourth plate portion 922.

In this case, the second limit switch 16 does not generate the second control signals C2 anymore and the electric motor 51 is prevented from performing an insertion operation of the switching unit 2.

Preferably, the electro-mechanical signalling arrangement 6 comprises a plurality of supporting plates 61, 62, 63 that are mutually coupled and fixed to the casing 41 of the truck assembly 4.

Said supporting plates are suitably shaped and arranged to maintain the auxiliary contact device 7, the motion transmission means 11, the actuation rods 81, 82 and the limit switches 15, 16 in their supporting positions.

The operation of the electro-mechanical signalling arrangement 6 is now described in more details.

The switching unit 2 is initially supposed to be in the insertion position A.

In this case:
- the first actuation rod 82 is in the first position B1, since the switching unit 2 is in a position (the insertion position A) that is different from the withdrawal position B;
- the second actuation rod 92 is in the fourth position A2, which corresponds to the insertion position A of the switching unit 2;
- the shaft 73 of the auxiliary contact device 7 is in the third rotation position R3, which corresponds to the insertion position A of the switching unit 2;
- the movable contacts 721 are coupled with the second pair of fixed contacts 712 and a second signalling current I2 flows through the second signalling circuit 752;
- the first limit switch 15 is activated. The electric motor 51 is enabled to perform a withdrawal operation of the switching unit 2;
- the second limit switch 16 is deactivated. The electric motor 51 is not enabled to perform an insertion operation of the switching unit 2.

The actuation means 5 are now supposed to be commanded to perform a withdrawal operation of the switching unit 2.

Figure 6:
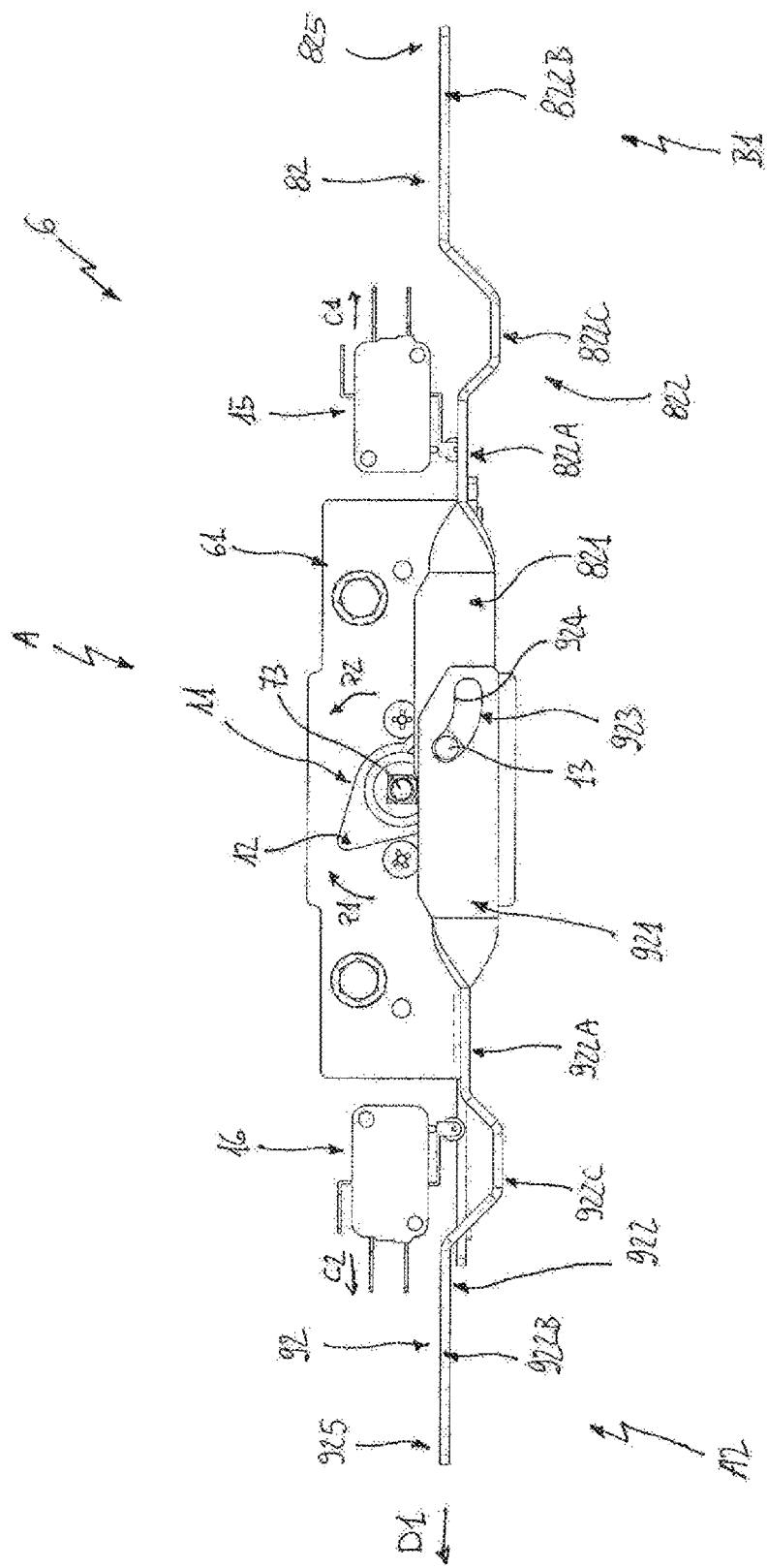
Figure 7:
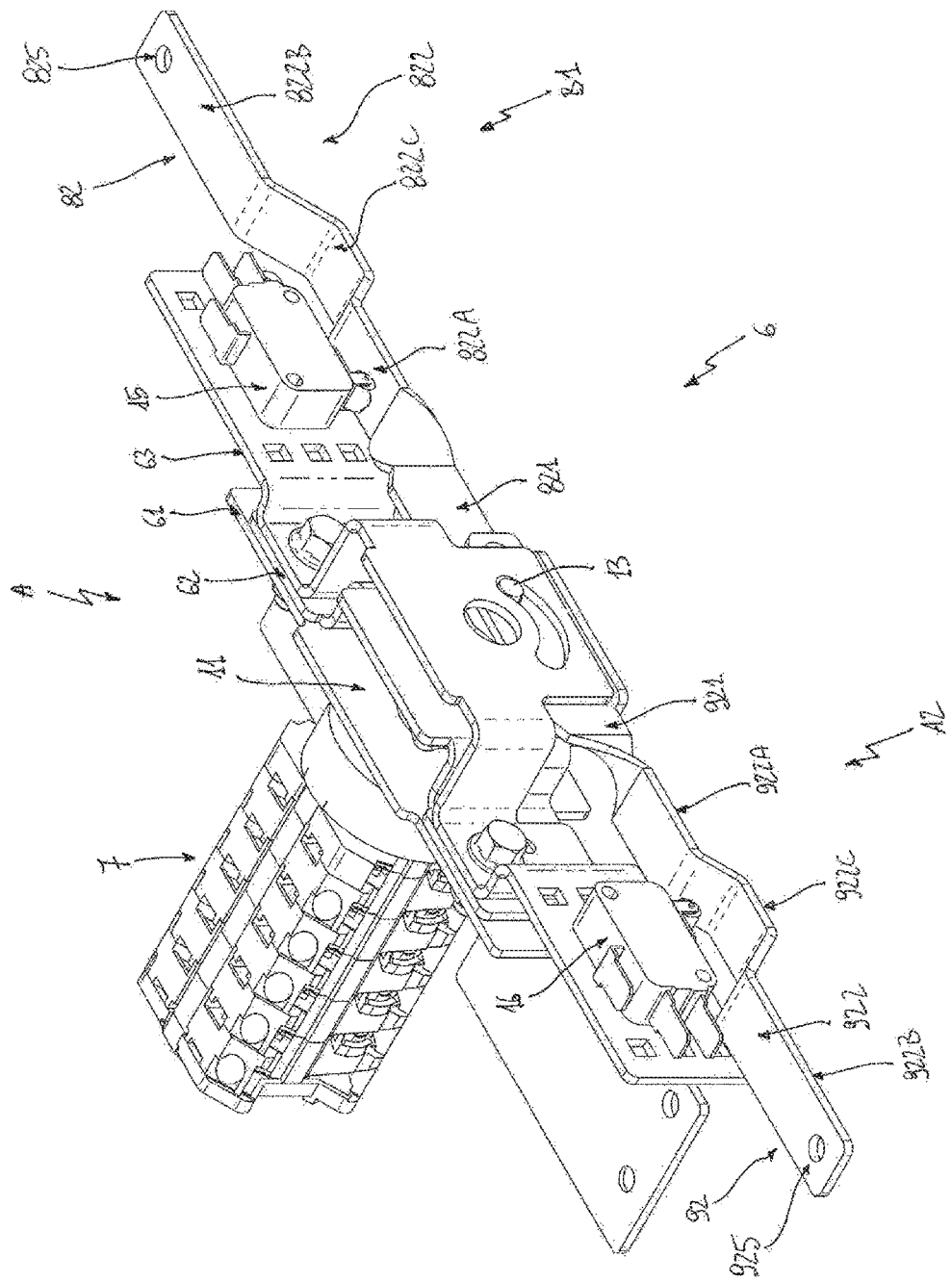
Figure 8:
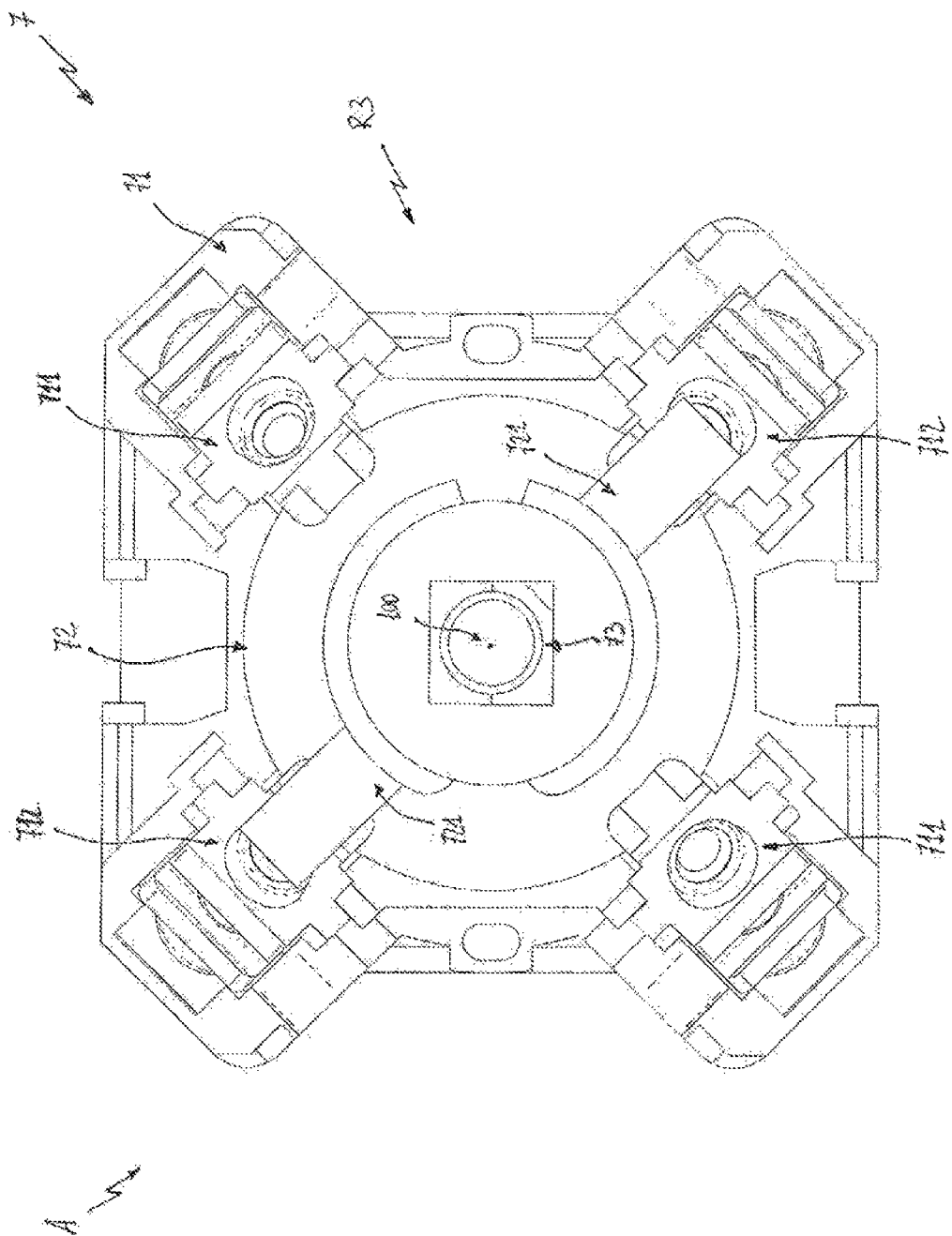
Figure 9:
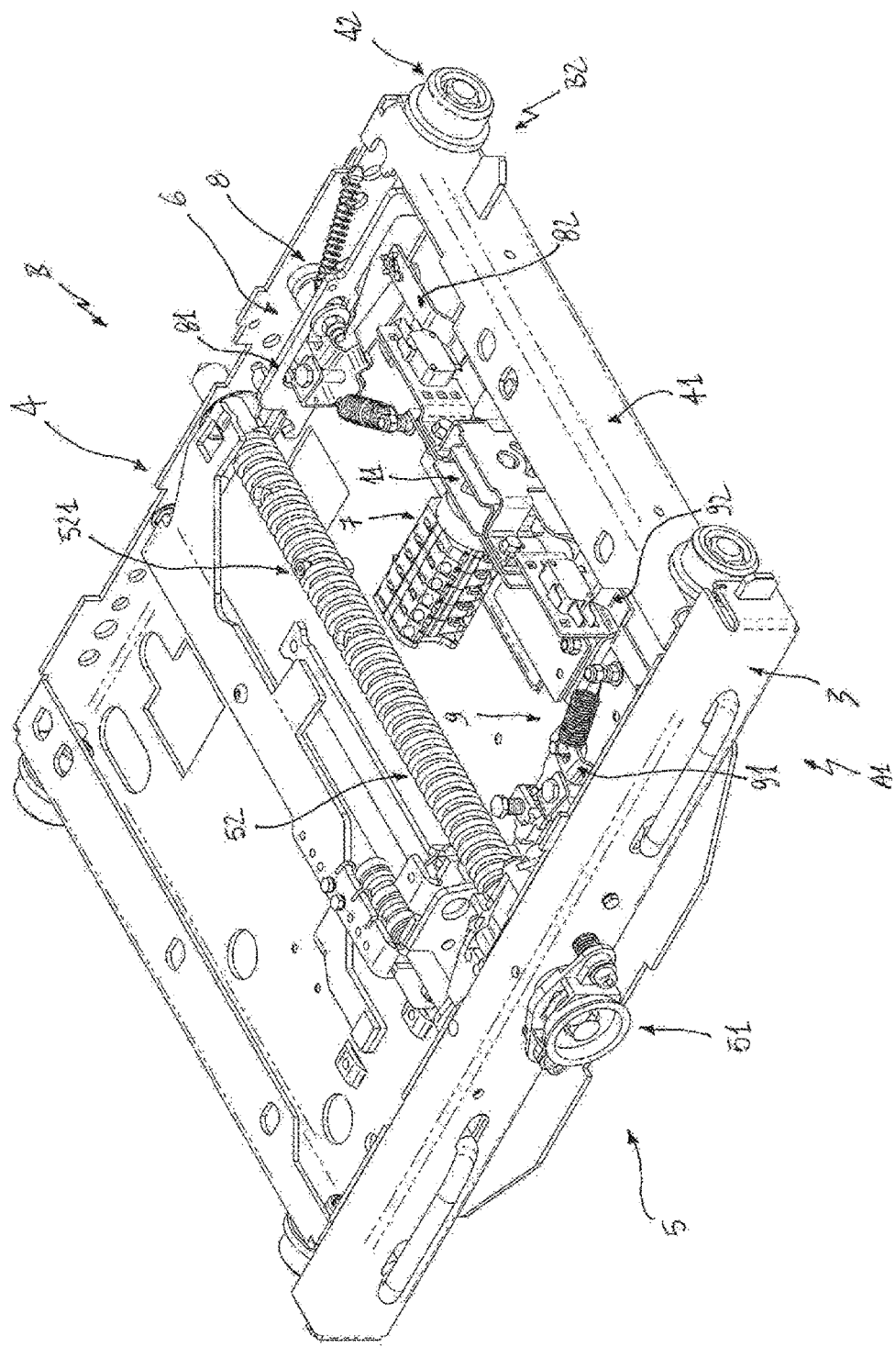
FIGS. 9-13 show schematic views of different portions of said electro-mechanical signalling arrangement with the switching unit in a withdrawal position.
Figure 10:
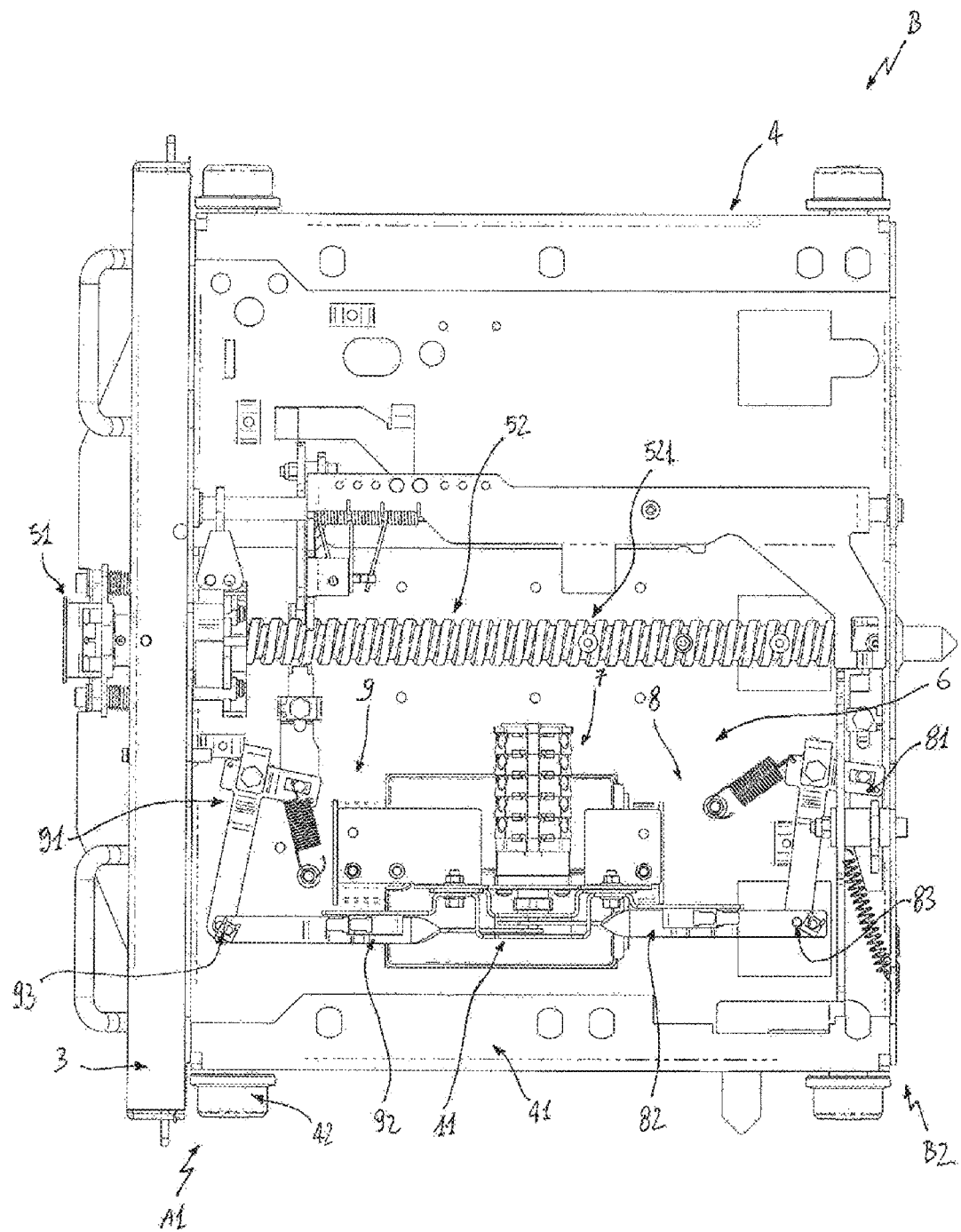

When the switching unit 2 leaves the insertion position A:
- the endless screw 52 activates the second actuation mechanism 91 that moves the second actuation rod 92 according to the first direction D1 (FIG. 6);
- the second actuation rod 92 is moved to the third position A1, since the switching unit 2 is in a position (an intermediate position C) that is different from the insertion position A;
- the second coupling surfaces 924 of the second actuation rod 92 cause the motion transmission pin 13 to rotate according to the first rotation direction P1;

the shaft 73 of the auxiliary contact device 7 is moved to the first rotation position R1, which corresponds to an intermediate position C of the switching unit 2;

the movable contacts 721 are not coupled with the fixed contacts 711, 712 and no signalling currents I1, I2 flow through the first and second signalling circuits 751, 752;

the second limit switch 16 is activated. The electric motor 51 is enabled to perform an insertion operation of the switching unit 2;

the first actuation mechanism 81 is not activated, the first actuation rod 82 is not moved and the first limit switch 15 remains activated.

It is evidenced that the second actuation rod 92 is no more moved once it is in the third position A1 up to the completion of the withdrawal operation of the switching unit 2. The second limit switch 16 thus remains activated.

Figure 15:
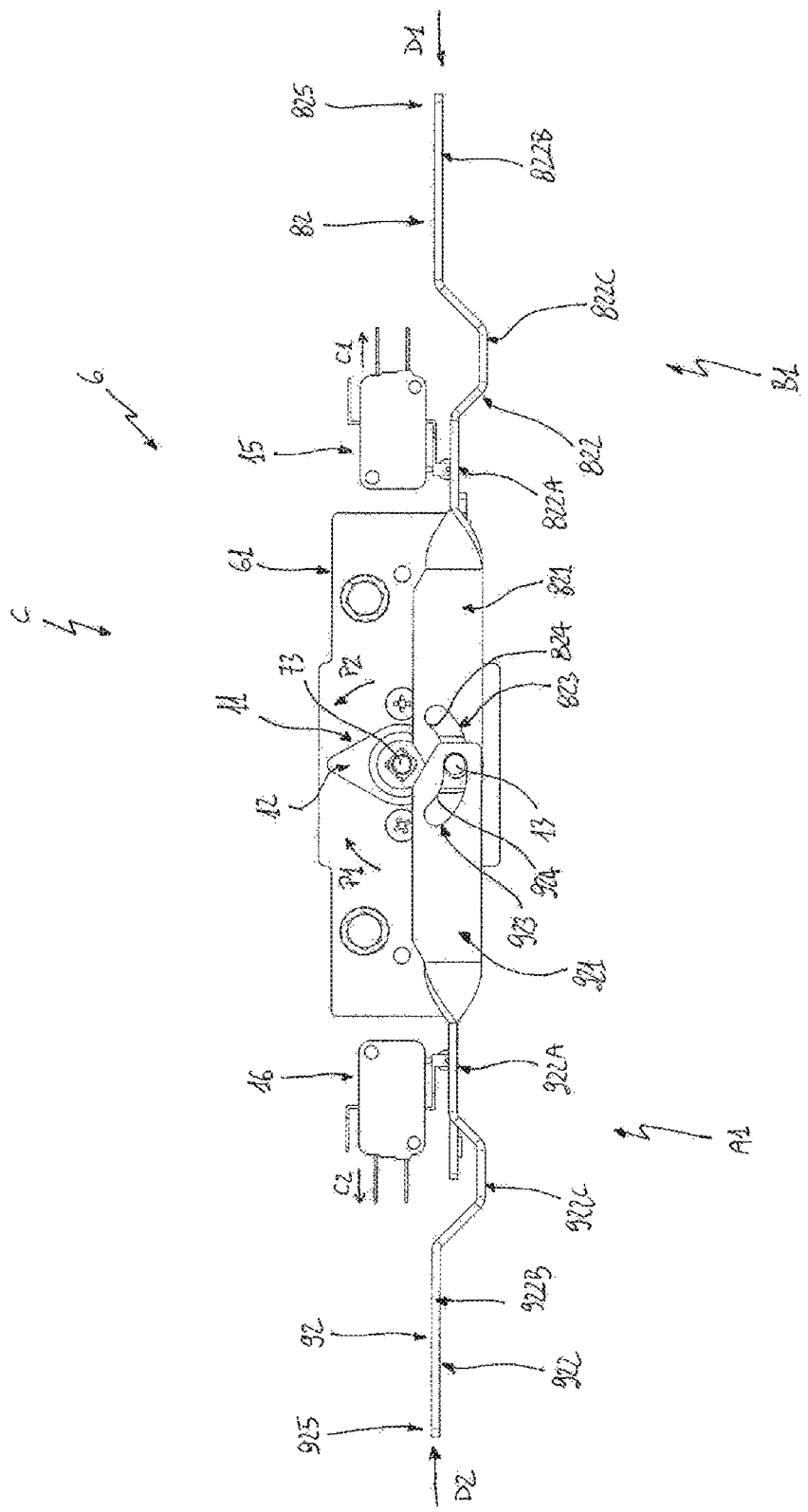
Figure 16:
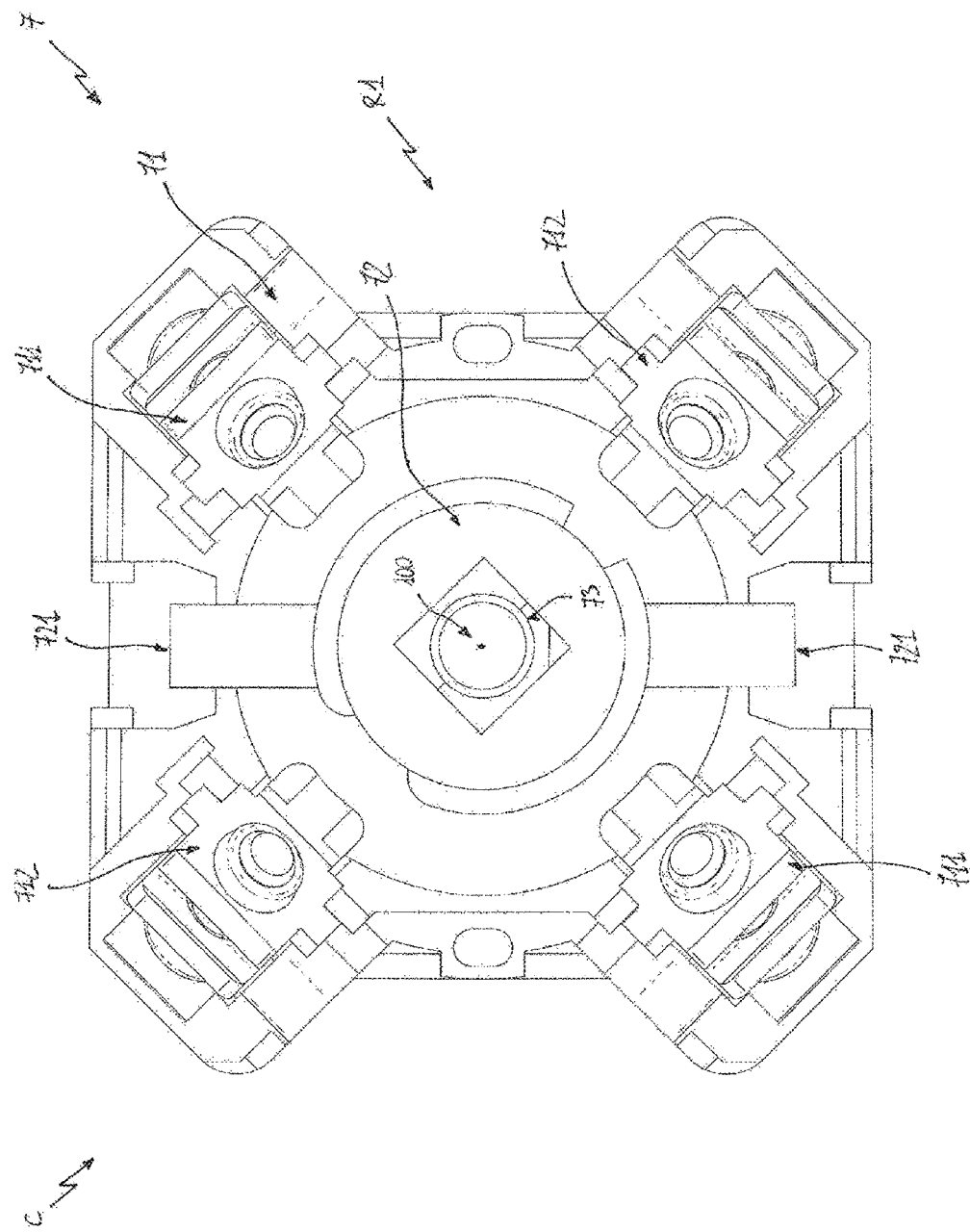
Figure 17:
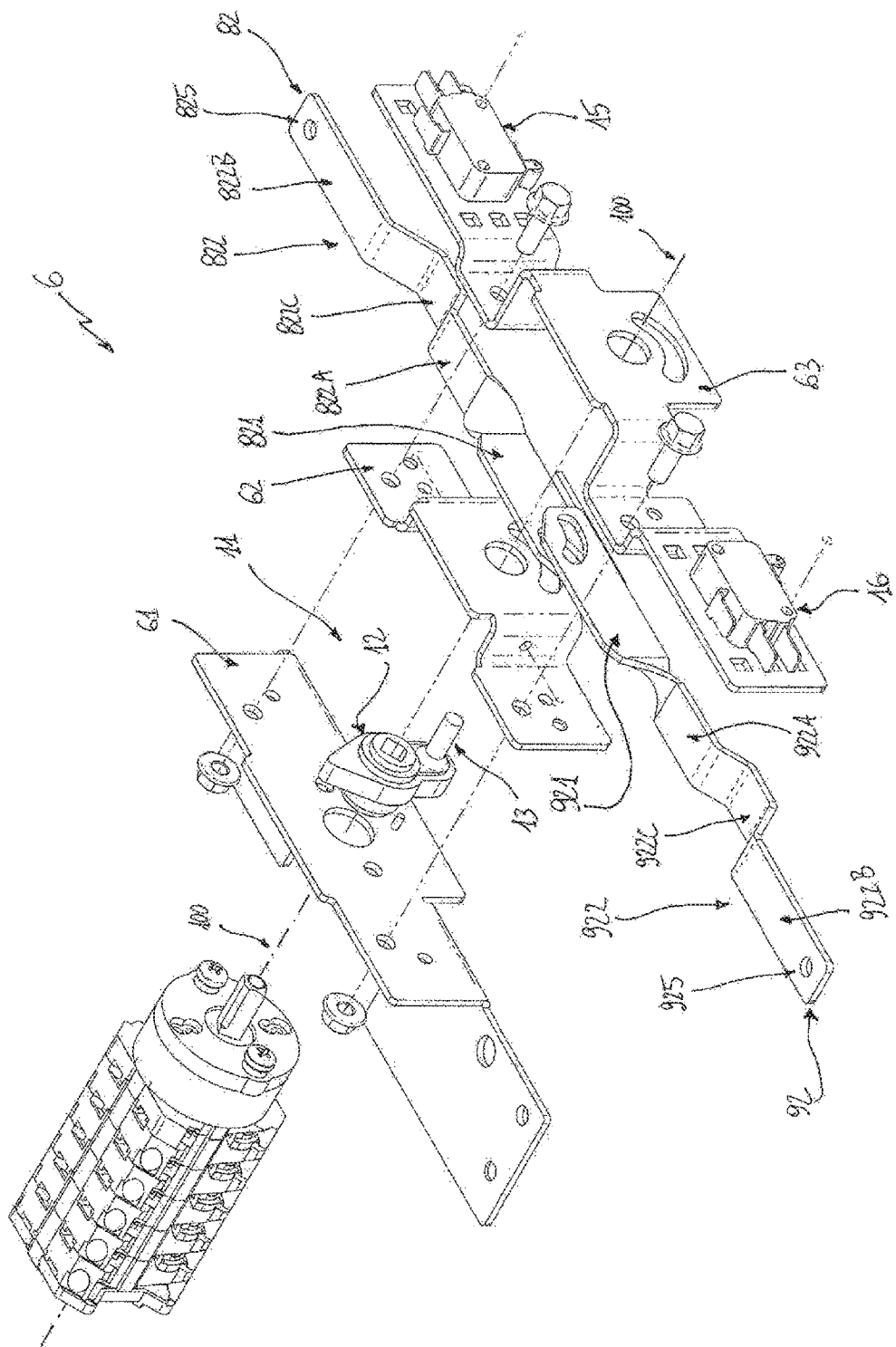
FIG. 17 shows a schematic exploded view of a portion of said electro-mechanical signalling arrangement.
Figure 18:
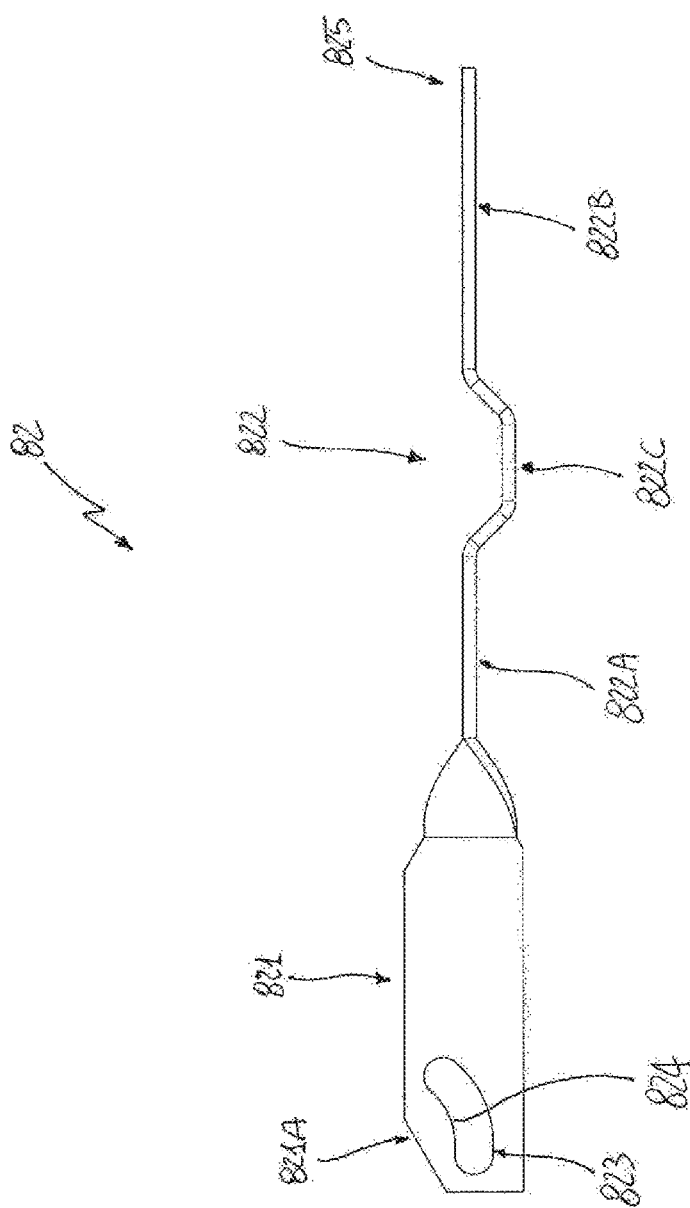
FIGS. 18-19 show further schematic views of different portions of said electro-mechanical signalling arrangement.
Figure 19:
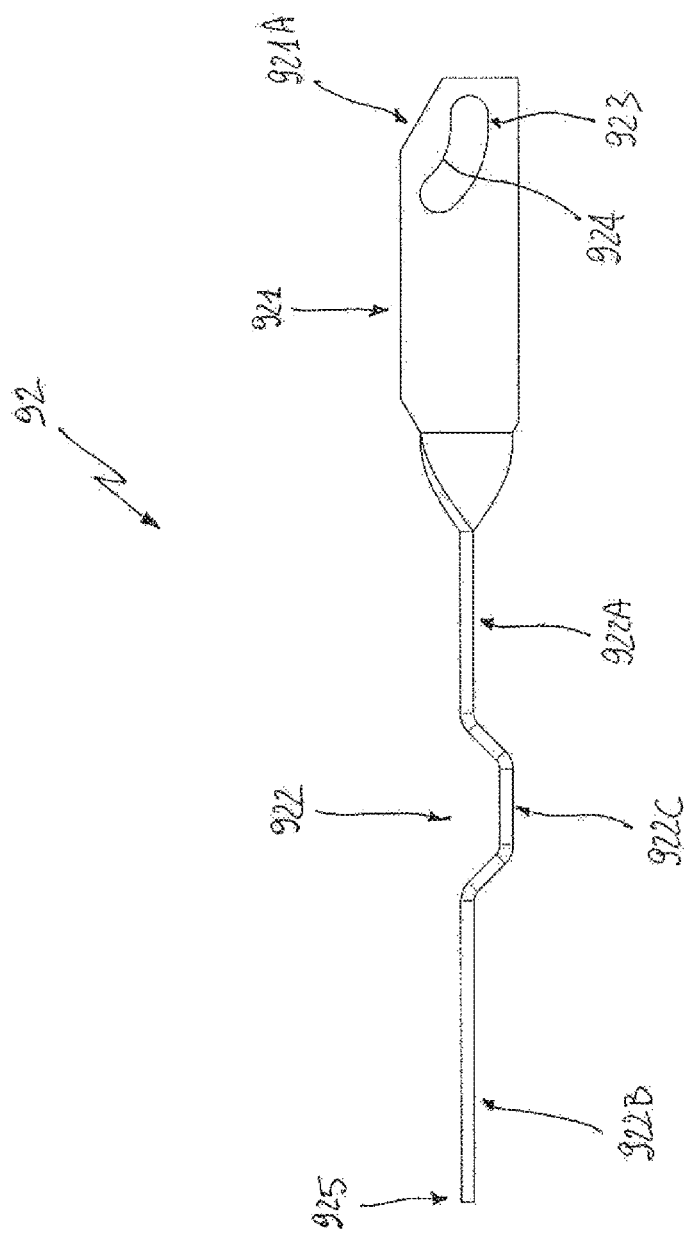
Figure 20:
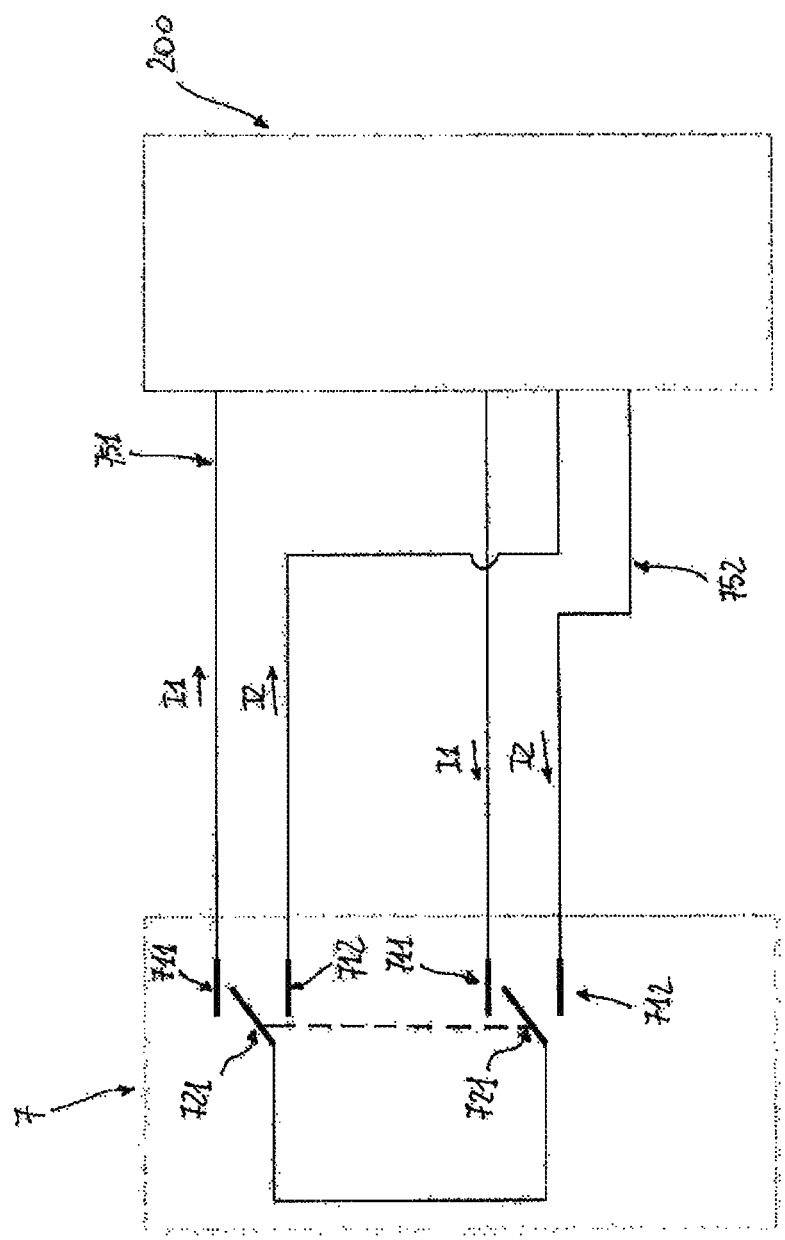
FIG. 20 show a schematic view of signalling circuits of said electro-mechanical signalling arrangement.

When the switching unit 2 finally reaches the withdrawal position B:

the endless screw 52 activates the first actuation mechanism 81 that moves the first actuation rod 82 according to the first direction D1 (FIG. 15);

the first actuation rod 82 is moved to the second position B2, which corresponds to the withdrawal position B of the switching unit 2;

the second actuation rod 92 is in the third position A1, since the switching unit 2 is in a position (the withdrawal position B) that is different from the insertion position A;

the first coupling surfaces 824 of the first actuation rod 82 cause the motion transmission pin 13 to rotate according to the first rotation direction P1;

the shaft 73 of the auxiliary contact device 7 is moved to the second rotation position R2, which corresponds to the withdrawal position B of the switching unit 2;

the movable contacts 721 couple with the first fixed contacts 711 and a first signalling current I1 flows through the first signalling circuit 751;

the first limit switch 15 is deactivated. The electric motor 51 is no more enabled to perform a withdrawal operation of the switching unit 2;

the second actuation mechanism 91 is not activated and the second actuation rod 92 is not moved;

the second limit switch 16 remains activated.

The actuation means 5 are now supposed to be commanded to perform an insertion operation of the switching unit 2.

Figure 11:
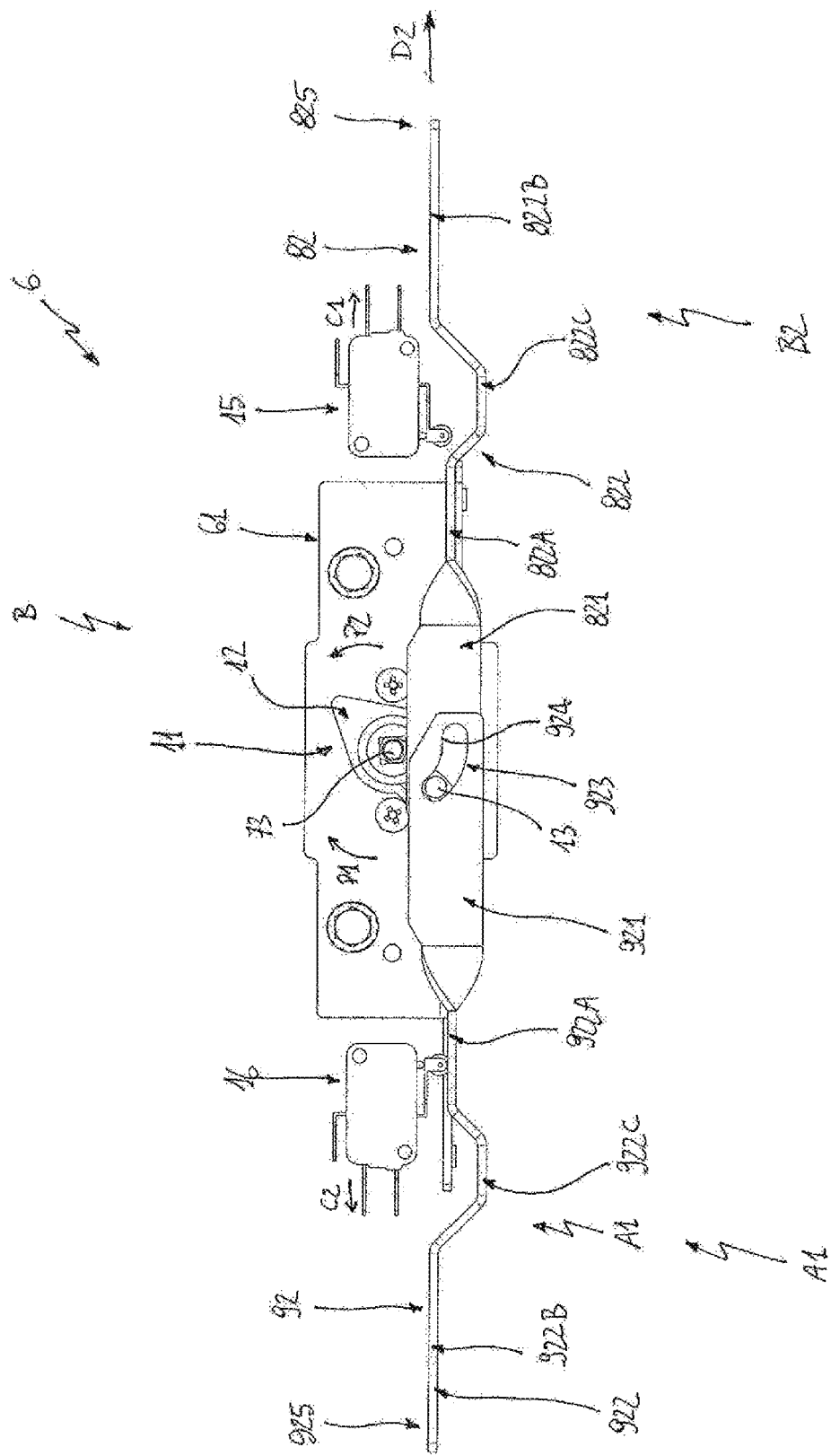
Figure 12:
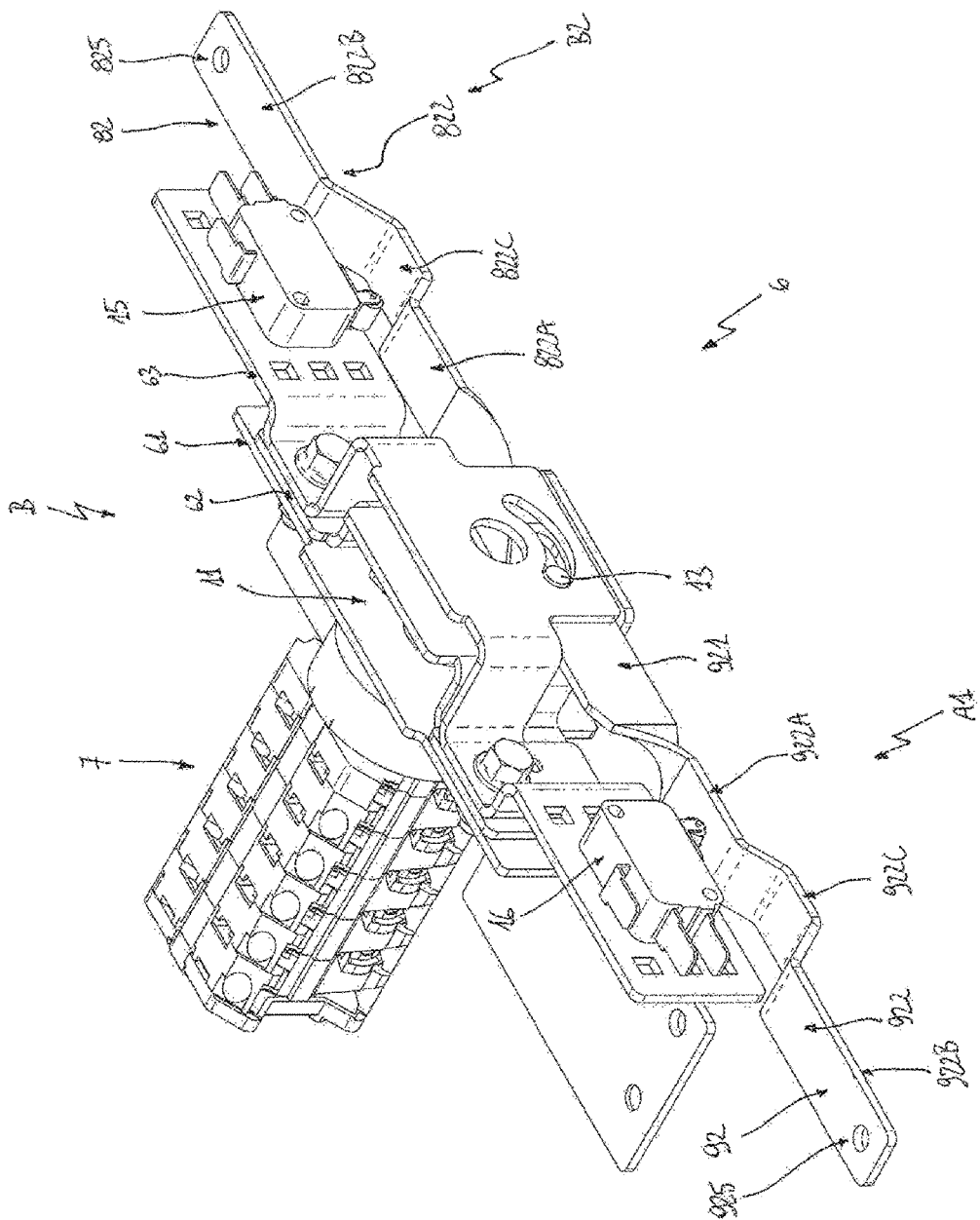
Figure 13:
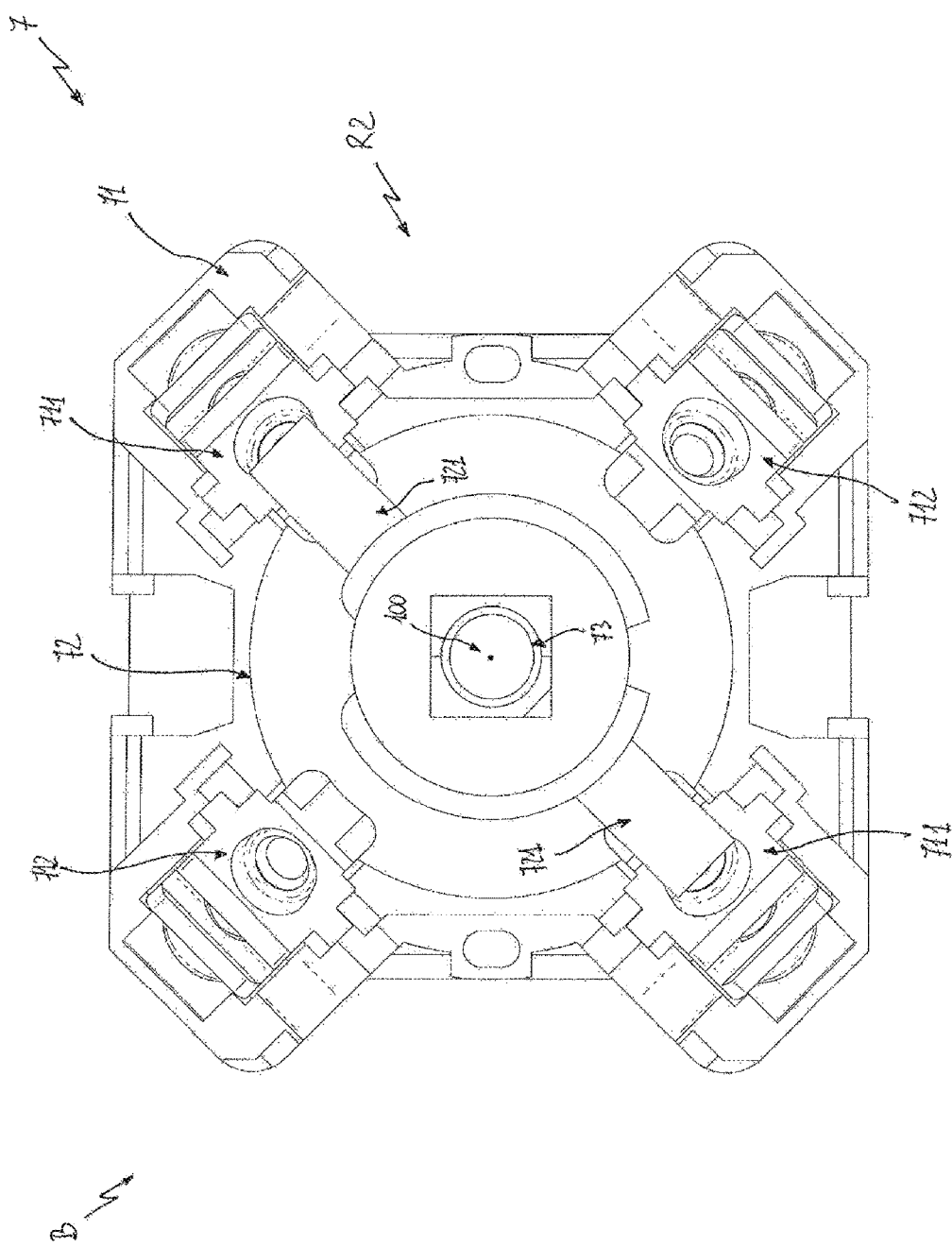
Figure 14:
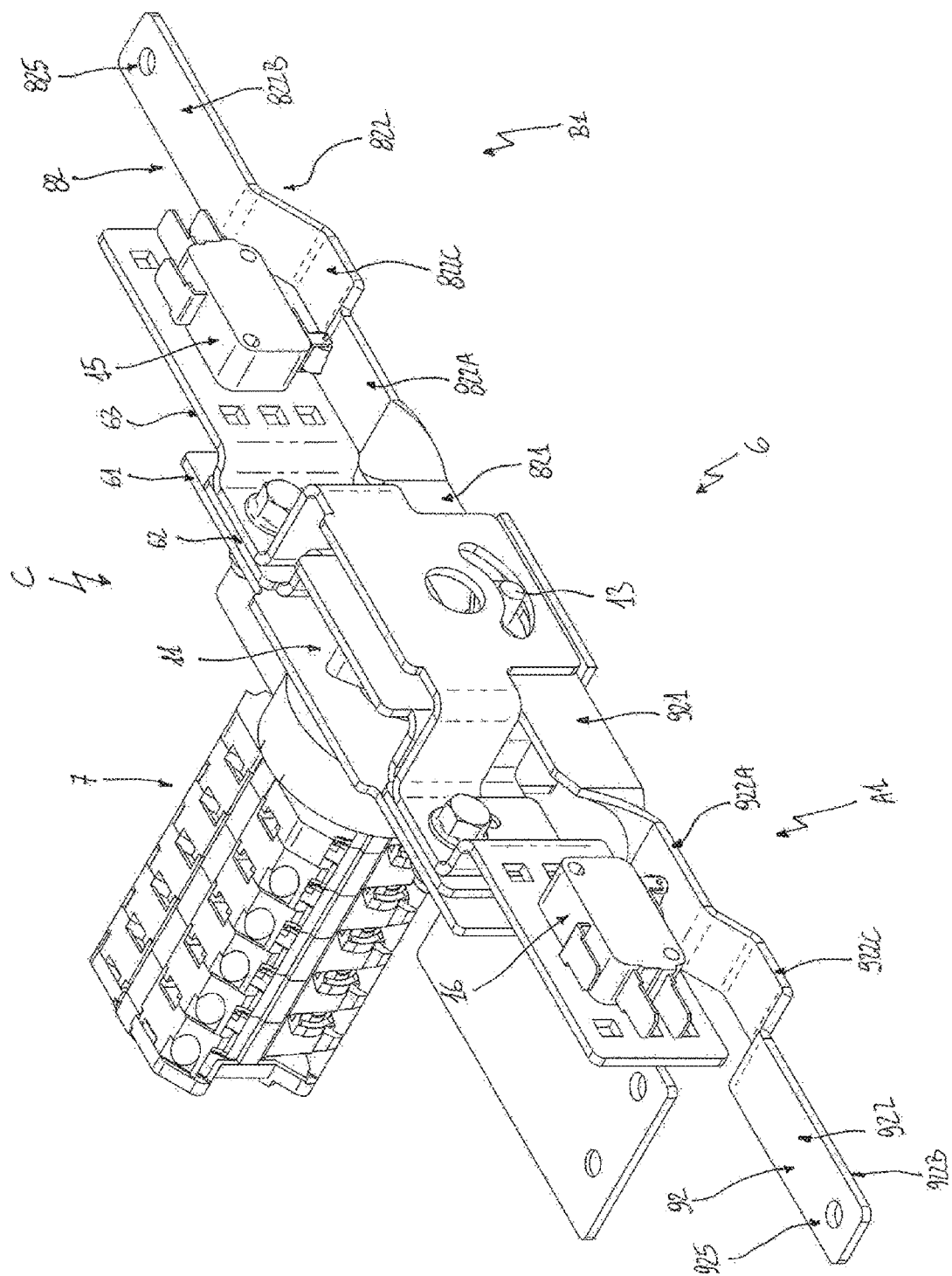
FIGS. 14-16 show schematic views of different portions of said electro-mechanical signalling arrangement with the switching unit in an intermediate position.

When the switching unit 2 leaves the withdrawal position B:

the endless screw 52 activates the first actuation mechanism 81 that moves the first actuation rod 82 according to the second direction D2, opposite to the first direction D1 (FIG. 11);

the first actuation rod 82 is moved to the first position B1, since the switching unit 2 is in a position (an intermediate position C) that is different from the withdrawal position B;

the first coupling surfaces 824 of the first actuation rod 82 cause the motion transmission pin 13 to rotate according to the second rotation direction P2, opposite to the first rotation direction P1;

the shaft 73 of the auxiliary contact device 7 is moved to the first rotation position R1;

the movable contacts 721 are not coupled with the fixed contacts 711, 712 and no signalling currents I1, I2 flow through the first and second signalling circuits 751, 752;

the first limit switch 15 is activated. The electric motor 51 is enabled to perform a withdrawal operation of the switching unit 2;

the second actuation mechanism 91 is not activated, the second actuation rod 92 is not moved and the second limit switch 16 remains activated.

It is evidenced that the first actuation rod 82 is no more moved once it is in the first position B1. The first limit switch 15 thus remains activated up to the completion of the insertion operation of the switching unit 2 . . . .

When the switching unit 2 finally reaches the insertion position A:

the endless screw 52 activates the second actuation mechanism 91 that moves the second actuation rod 92 according to the second direction D2 (FIG. 15);

the second actuation rod 92 is moved to the fourth position A2, which corresponds to the insertion position A of the switching unit 2;

the first actuation rod 82 remains in the first position B1, since the switching unit 2 is in a position (the insertion position A) that is different from the withdrawal position B;

the second coupling surfaces 924 of the second actuation rod 92 cause the motion transmission pin 13 to rotate according to the second rotation direction P2;

the shaft 73 of the auxiliary contact device 7 is moved to the third rotation position R3;

the movable contacts 721 couple with the second fixed contacts 712 and a second signalling current I2 flows through the second signalling circuit 752;

the second limit switch 16 is deactivated. The electric motor 51 is not enabled to perform an insertion operation of the switching unit 2;

the first actuation mechanism 81 is not activated and the first actuation rod 82 is not moved;

the first limit switch 15 remains activated.

The functioning of the electro-mechanical signalling arrangement 6 has been described with reference to the execution of a complete insertion operation or a complete withdrawal operation by the actuation means 5.

The skilled person would certainly understand that an insertion/withdrawal operation may be reversed when the actuation rods 82, 92 are, at the same time, in the operative position B1 and A1, respectively.

In fact, in this case, both the first and second limit switch 15, 16 are activated and electric motor 51 is enabled to perform both a withdrawal and an insertion operation of the switching unit 2.

If an insertion/withdrawal operation are interrupted and reversed, the electro-mechanical signalling arrangement 6 will operate according to suitable portions of the operation cycles described above.

The switchgear apparatus, according to the invention, allows achieving the intended aims and objects.

The electro-mechanical signalling arrangement of the switchgear apparatus according to the invention comprises a single auxiliary contact device of the rotational type, which is alternatively actuated by said signalling mechanisms, during an insertion or withdrawal operation of the switching unit.

This allows integrating in a single device the functions that are normally executed by two separated auxiliary contact devices in traditional solutions.

Further, this allows structurally simplifying the kinematic chains that are activated by the actuation means.

These technical features allow achieving remarkable savings of weight and size and a relevant structural simplification of the electro-mechanical signalling arrangement with respect to the currently available technical solutions.

The switchgear apparatus, according to the invention, is thus easier and less expensive to assembly at industrial level and install on the field with respect to traditional apparatuses.

The invention claimed is:
1. A switchgear apparatus comprising:
a switching unit comprising one or more electric poles;
a truck assembly, on which said switching unit is mounted, said truck assembly being movable with respect to a supporting frame;
actuation means for moving said truck assembly, said switching unit being reversibly movable between an insertion position (A), at which said switching unit is electrically connected to an electric line, and a withdrawal position (B), at which said switching unit is electrically disconnected from said electric line;
an electro-mechanical signalling arrangement that is mounted on said truck assembly, said electromechanical signalling arrangement interacting with said actuation means to provide electric signals indicative of the position of the switching unit at said insertion position (A), at said withdrawal position (B) or at an intermediate position (C) that is different from said insertion position and said withdrawal position;
wherein said electro-mechanical signalling arrangement comprises:
an auxiliary contact device comprising a fixed contact sub-assembly having a plurality of fixed contacts, a movable contact sub-assembly having at least a movable contact that is rotationally couplable with said fixed contacts, and a rotating shaft that is free to rotate around a first axis and that is solidly coupled with said movable contact sub-assembly;
a first signalling mechanism, which comprises a first actuation mechanism that interacts with said actuation means, and a first actuation rod that is operatively connected to said first actuation mechanism, said first actuation mechanism moving said first actuation rod with a linear motion between a first position B1), which corresponds to a position (A, C) of the switching unit that is different from said withdrawal position (B), and a second position (B2), which corresponds to said withdrawal position (B) of the switching unit;
a second signalling mechanism, which comprises a second actuation mechanism that interacts with said actuation means, and a second actuation rod that is operatively connected to said second actuation mechanism, said second actuation mechanism moving said second actuation rod with a linear motion between a third position (A1), which corresponds to a position (B, C) of the switching unit that is different from said insertion position (A), and a fourth position (A2), which corresponds to said insertion position (A) of the switching unit;
motion transmission means that mechanically couple said first and second actuation rod with said rotating shaft, said first actuation rod reversibly moving said rotating shaft between a first rotation position (R1), which corresponds to said intermediate position (C) of the switching unit, and a second rotation position (R2), which corresponds to said withdrawal position (B) of the switching unit, said second actuation rod reversibly moving said rotating shaft between said first rotation position (R1) and a third rotation position (R3), which corresponds to said insertion position (A) of the switching unit.

2. A switchgear apparatus, according to claim 1, wherein said motion transmission means comprise a crank member, which is solidly coupled to said rotating shaft, and a motion transmission pin, which protrudes from said crank member along a second axis that is parallel and spaced with respect to said first axis, said motion transmission pin being operatively coupled with said first and second actuation rod.

3. A switchgear apparatus, according to claim 1, wherein said first actuation rod comprises a first plate portion, which is oriented perpendicularly with respect to said first axis, and a second plate portion, which is oriented perpendicularly with respect to said first plate portion.

4. A switchgear apparatus, according to claim 1, wherein said second actuation rod comprises a third plate portion, which is oriented perpendicularly with respect to said first axis, and a fourth plate portion, which is oriented perpendicularly with respect to said third plate portion.

5. A switchgear apparatus, according to claim 4, wherein said first actuation rod comprises a first plate portion, which is oriented perpendicularly with respect to said first axis, and a second plate portion, which is oriented perpendicularly with respect to said first plate portion and wherein said first plate portion and said third plate portion at least partially overlap one to another and are mechanically coupled to said motion transmission means.

6. A switchgear apparatus, according to claim 5, wherein said motion transmission means comprise a crank member, which is solidly coupled to said rotating shaft, and a motion transmission pin, which protrudes from said crank member along a second axis that is parallel and spaced with respect to said first axis, said motion transmission pin being operatively coupled with said first and second actuation rod, and wherein said first plate portion comprises a first slot having one or more first coupling surfaces with said motion transmission pin passing through said first slot.

7. A switchgear apparatus, according to claim 5, wherein said motion transmission means comprise a crank member, which is solidly coupled to said rotating shaft, and a motion transmission pin, which protrudes from said crank member along a second axis that is parallel and spaced with respect to said first axis, said motion transmission pin being operatively coupled with said first and second actuation rod, and wherein said third plate portion comprises a second slot having one or more second coupling surfaces with said transmission pin passing through said second slot.

8. A switchgear apparatus, according to claim 7, wherein said first plate portion comprises a first slot having one or more first coupling surfaces with said motion transmission pin passing through said first slot and wherein said first and second coupling surfaces having complementary curved profiles, so that said first and second actuation rod reversibly move said motion transmission pin along a circumference portion centred on said first axis.

9. A switchgear apparatus, according to claim 1, wherein electro-mechanical signalling arrangement comprises a first limit switch that provides first control signals (C1) to enable/disable an electric motor, which is comprised in said actuation means, to perform an withdrawal operation of said switching unit.

10. A switchgear apparatus, according to claim 9, wherein said first actuation rod comprises a first plate portion, which is oriented perpendicularly with respect to said first axis, and a second plate portion, which is oriented perpendicularly with respect to said first plate portion and wherein said first limit switch is operatively coupled with the second plate portion of said first actuation rod.

11. A switchgear apparatus, according to claim 1, wherein electro-mechanical signalling arrangement comprises a second limit switch that provides second control (C2) to enable/disable an electric motor, which is comprised in said actuation means, to perform an insertion operation of said switching unit.

12. A switchgear apparatus, according to claim 11, wherein said second actuation rod comprises a third plate portion, which is oriented perpendicularly with respect to said first axis, and a fourth plate portion, which is oriented perpendicularly with respect to said third plate portion and wherein said second limit sensor is operatively coupled with the fourth plate portion of said second actuation rod.

13. An electromechanical signalling arrangement for a switchgear apparatus, said switchgear apparatus comprising:
a switching unit comprising one or more electric poles;
a truck assembly, on which said switching unit is mounted, said truck assembly being movable with respect to a supporting frame;
actuation means for moving said truck assembly, said switching unit being reversibly movable between an insertion position (A), at which said switching unit is electrically connected to an electric line, and a withdrawal position (B), at which said switching unit is electrically disconnected from said electric line;
said electro-mechanical signalling arrangement being mounted on said truck assembly and interacting with said actuation means to provide electric signals indicative of the position of the switching unit at said insertion position (A), at said withdrawal position (B) or at an intermediate position (C) that is different from said insertion position and said withdrawal position;
which comprises:
an auxiliary contact device comprising a fixed contact sub-assembly having a plurality of fixed contacts, a movable contact sub-assembly having at least a movable contact that is rotationally couplable with said fixed contacts, and a rotating shaft that is free to rotate around a first axis and that is solidly coupled with said movable contact sub-assembly;
a first signalling mechanism, which comprises a first actuation mechanism that interacts with said actuation means, and a first actuation rod that is operatively connected to said first actuation mechanism, said first actuation mechanism moving said first actuation rod with a linear motion between a first position (B1), which corresponds to a position (A, C) of the switching unit that is different from said withdrawal position (B), and a second position, which corresponds to said withdrawal position (B) of the switching unit;
a second signalling mechanism, which comprises a second actuation mechanism that interacts with said actuation means, and a second actuation rod that is operatively connected to said second actuation mechanism, said second actuation mechanism moving said second actuation rod with a linear motion between a third position (A1), which corresponds to a position (B, C) of the switching unit that is different from said insertion position (A), and a fourth position (A2), which corresponds to said insertion position (A) of the switching unit;
motion transmission means that mechanically couple said first and second actuation rod with said rotating shaft, said first actuation rod reversibly moving said rotating shaft between a first rotation position (R1), which corresponds to said intermediate position (C) of the switching unit, and a second rotation position (R2), which corresponds to said withdrawal position (B) of the switching unit, said second actuation rod reversibly moving said rotating shaft between said first rotation position (R1) and a third rotation position (R3), which corresponds to said insertion position (A) of the switching unit.

14. A switchgear apparatus, according to claim 2, wherein said first actuation rod comprises a first plate portion, which is oriented perpendicularly with respect to said first axis, and a second plate portion, which is oriented perpendicularly with respect to said first plate portion.

15. A switchgear apparatus, according to claim 2, wherein said second actuation rod comprises a third plate portion, which is oriented perpendicularly with respect to said first axis, and a fourth plate portion, which is oriented perpendicularly with respect to said third plate portion.

16. A switchgear apparatus, according to claim 3, wherein said second actuation rod comprises a third plate portion, which is oriented perpendicularly with respect to said first axis, and a fourth plate portion, which is oriented perpendicularly with respect to said third plate portion.

17. A switchgear apparatus, according to claim 2, wherein electro-mechanical signalling arrangement comprises a first limit switch that provides first control signals (C1) to enable/disable an electric motor, which is comprised in said actuation means, to perform an withdrawal operation of said switching unit.

18. A switchgear apparatus, according to claim 3, wherein electro-mechanical signalling arrangement comprises a first limit switch that provides first control signals (C1) to enable/disable an electric motor, which is comprised in said actuation means, to perform an withdrawal operation of said switching unit.

19. A switchgear apparatus, according to claim 4, wherein electro-mechanical signalling arrangement comprises a first limit switch that provides first control signals (C1) to enable/disable an electric motor, which is comprised in said actuation means, to perform an withdrawal operation of said switching unit.

20. A switchgear apparatus, according to claim 5, wherein electro-mechanical signalling arrangement comprises a first limit switch that provides first control signals (C1) to enable/disable an electric motor, which is comprised in said actuation means, to perform an withdrawal operation of said switching unit.

* * * * *